United States Patent
Chien

(10) Patent No.: US 10,337,719 B2
(45) Date of Patent: *Jul. 2, 2019

(54) USB CHARGER DEVICE HAVING ADDITIONAL FUNCTIONS

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/899,942

(22) Filed: Feb. 20, 2018

(65) Prior Publication Data

US 2018/0274776 A1   Sep. 27, 2018

Related U.S. Application Data

(63) Continuation-in-part of application No. 15/340,367, filed on Nov. 1, 2016, now abandoned, which is a
(Continued)

(51) Int. Cl.
    *H02J 7/00* (2006.01)
    *F21V 33/00* (2006.01)
    (Continued)

(52) U.S. Cl.
    CPC ............ *F21V 33/00* (2013.01); *A01K 63/006* (2013.01); *A01K 63/06* (2013.01); *A63H 3/003* (2013.01);
    (Continued)

(58) Field of Classification Search
    CPC ...................................................... Y02E 60/12
    (Continued)

(56) References Cited

U.S. PATENT DOCUMENTS

| 2,011,017 A | 8/1935 | Sheehan et al. |
| 5,926,440 A | 7/1999 | Chien |

(Continued)

*Primary Examiner* — Yalkew Fantu
(74) *Attorney, Agent, or Firm* — Bacon & Thomas, PLLC

(57) ABSTRACT

Desktop USB Charge device has a built-in or added-on decorative or-and functional unit. The decorative or-and function unit is one of (1) compartment product has medium and miniature-items within the medium including decorative, reflective, glitter, or-and heater to cause inner items moved, or (2) stationary organizer, or (3) moving, shaking, vibration, rotating, spin product, or (4) Physic-products, or (5) compartment assembly to put items within, or (6) music or smell device, or (7) magnetic reaction products. The desktop USB charger device has USB charger-unit not only supplied power to other external product but also has additional (a) USB can delivery digital-signal or digital-data to other computer or communication related products including external consumer electric device, or communication device, printer, scanner, hard-disc, storage device, camera, video camera. The USB charger device may further include additional devices such as an AC outlets(s), sensor, motion sensor, remote control, timer, LEDs, power fail circuitry, audio, video, or smell devices, or other electric or electronic devices to provide one or more additional functions in addition to the charging function to let people has safety and convenience to operate all computer and communication products for charging and digital-data operation only at Desktop with addition decorative or-and functional unit for multiple functions. It also can offer LED light illumination.

18 Claims, 12 Drawing Sheets

Related U.S. Application Data continuation of application No. 13/870,447, filed on Apr. 25, 2013, now Pat. No. 9,488,364.

(51) Int. Cl.
| | |
|---|---|
| *G09F 23/04* | (2006.01) |
| *A01K 63/06* | (2006.01) |
| *G09F 23/06* | (2006.01) |
| *B44C 5/00* | (2006.01) |
| *G09F 23/02* | (2006.01) |
| *F21S 10/00* | (2006.01) |
| *A01K 63/00* | (2017.01) |
| *A63H 23/08* | (2006.01) |
| *A63H 3/00* | (2006.01) |
| *F21S 8/00* | (2006.01) |
| *F21W 121/00* | (2006.01) |

(52) U.S. Cl.
CPC ............... *A63H 23/08* (2013.01); *B44C 5/00* (2013.01); *F21S 10/002* (2013.01); *G09F 23/02* (2013.01); *G09F 23/04* (2013.01); *G09F 23/06* (2013.01); *F21S 8/035* (2013.01); *F21W 2121/00* (2013.01)

(58) Field of Classification Search
USPC ........................................................ 320/107
See application file for complete search history.

(56) References Cited

U.S. PATENT DOCUMENTS

| | | | |
|---|---|---|---|
| 6,474,823 | B1 | 11/2002 | Agata et al. |
| 6,666,563 | B2 | 12/2003 | Brown |
| 7,318,652 | B2 | 1/2008 | Pohlert et al. |
| 7,651,365 | B2 | 1/2010 | Chien |
| 7,722,230 | B2 | 5/2010 | Chien |
| 7,726,839 | B2 | 6/2010 | Chien |
| 7,726,841 | B2 | 6/2010 | Chien |
| 7,726,869 | B2 | 6/2010 | Chien |
| 7,736,033 | B2 | 6/2010 | Patel |
| 7,810,985 | B2 | 10/2010 | Chien |
| 7,897,277 | B2 | 3/2011 | Meyer et al. |
| 7,909,477 | B2 | 3/2011 | Chien |
| 2002/0130638 | A1* | 9/2002 | Sherman ............... G06F 1/26 320/134 |
| 2004/0108833 | A1* | 6/2004 | Lanni ................. H02J 7/0004 320/116 |
| 2004/0113587 | A1* | 6/2004 | Bohne ................. H02J 7/0004 320/128 |
| 2004/0257034 | A1* | 12/2004 | Moayer ............. H01M 10/441 320/107 |
| 2006/0087281 | A1* | 4/2006 | Tong ................... H02J 7/0042 320/106 |
| 2008/0143294 | A1 | 6/2008 | Phelps et al. |
| 2014/0303557 | A1 | 10/2014 | Lopez |

* cited by examiner

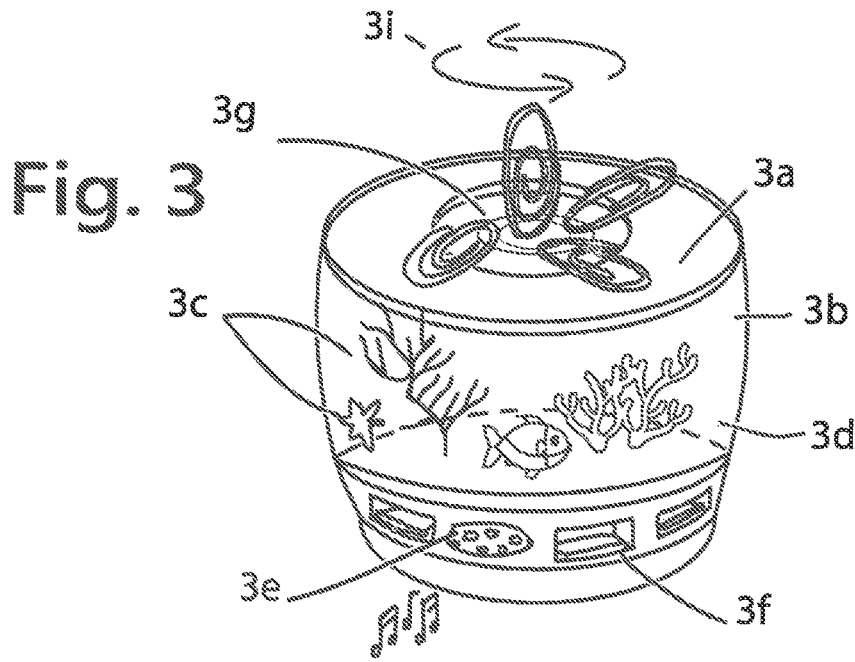
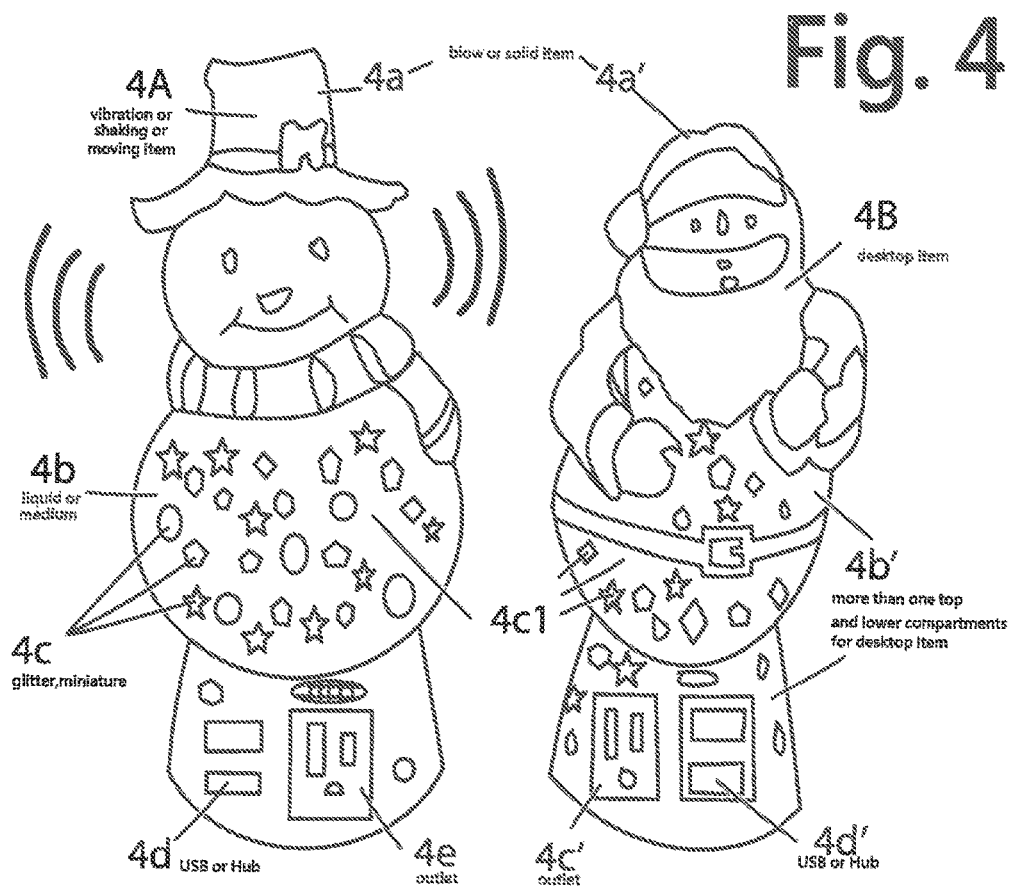

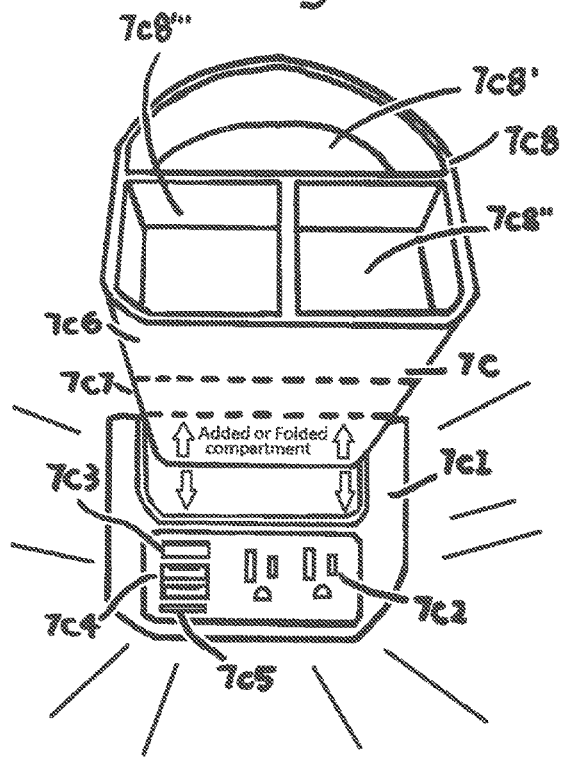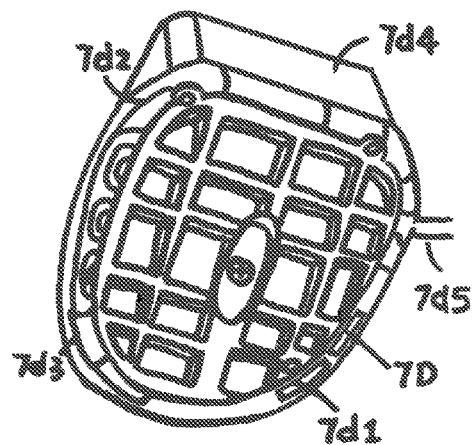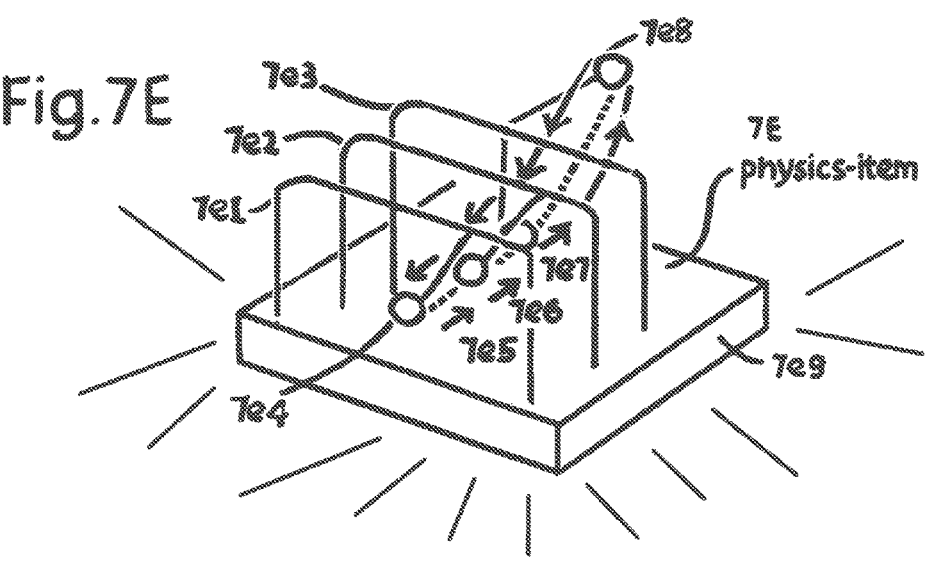

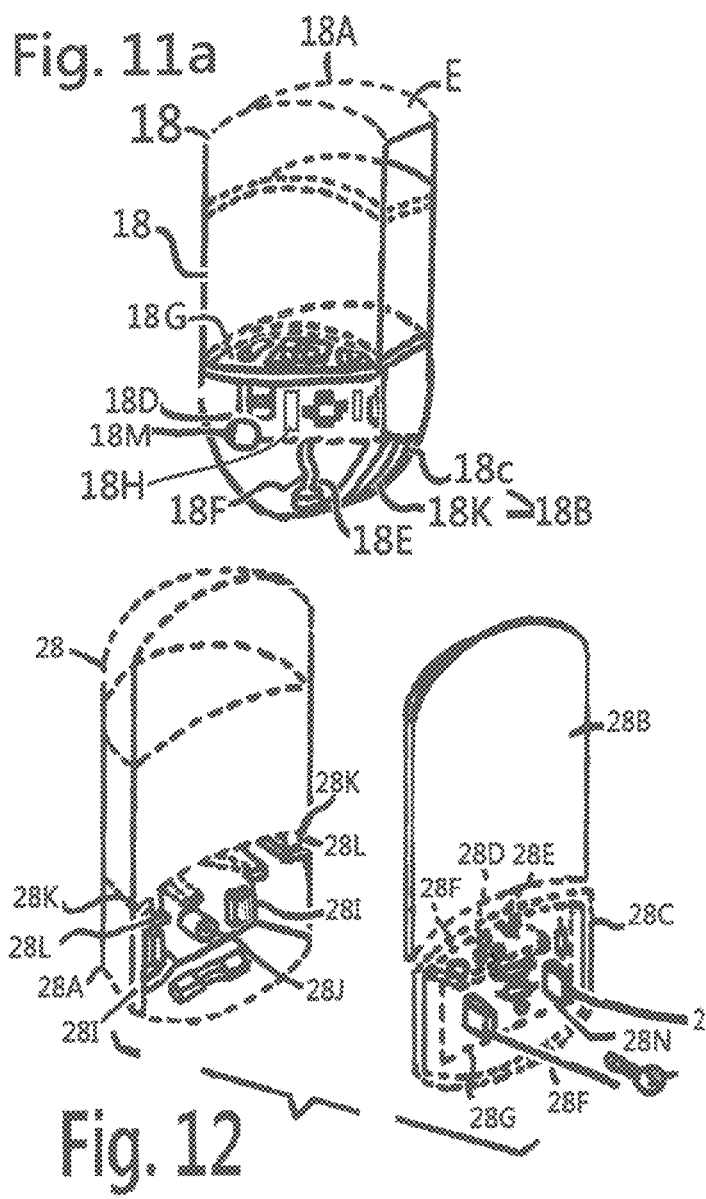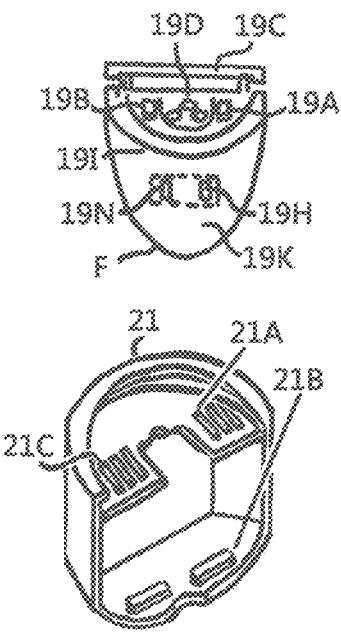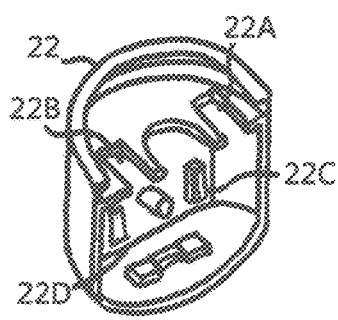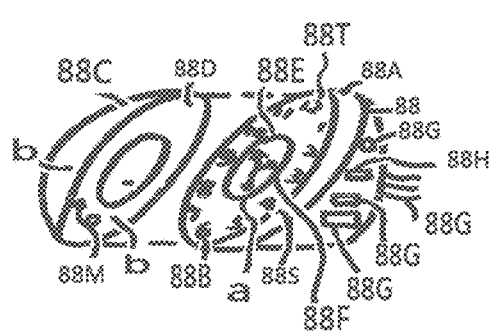

DeskTop

Wired or Transformer or adaptor-wired

Prong or wired or AC-Plug Wire

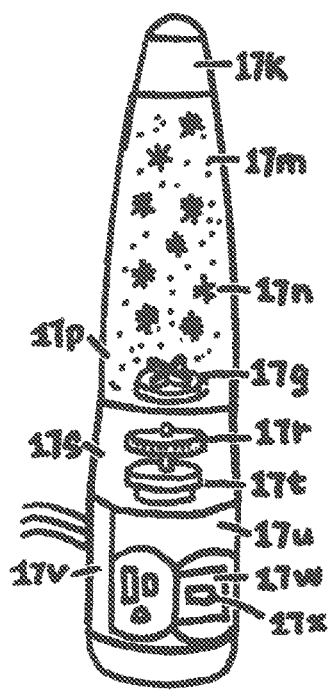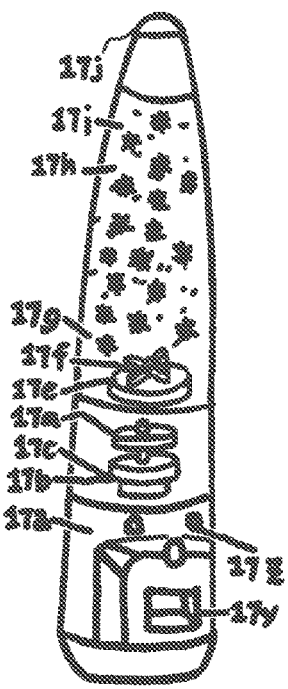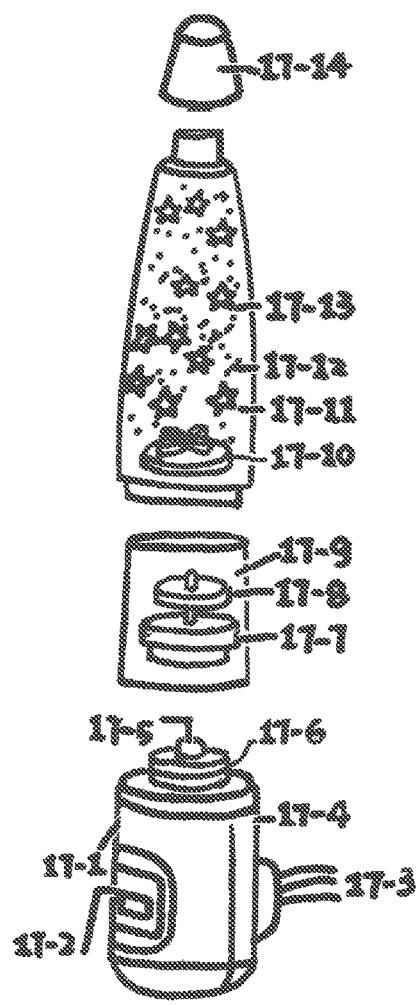

USB CHARGER DEVICE HAVING ADDITIONAL FUNCTIONS

The current invention may is CIP filing case of parent pending case to the following:

(1)

(# UUU-1) U.S. application Ser. No. 15/340,367 filed date Nov. 1, 2016, Publication US2017-011-7377 Public date on Apr. 27, 2017, Now Abandoment.

Which is CIP of (# UUU-2013) U.S. application Ser. No. 13/870,447 Filed on Apr. 25, 2013, US Publication Number 2014-032-0064 publication date on Oct. 30, 2014, U.S. Pat. No. 9,488,364 Issued date on Nov. 8, 2016.

(2)

(# CCC-2010) U.S. Ser. No. 12/950,017 Filed on Nov. 19, 2010, Publication US 2012-012-7708 public date May 24, 2012, Now is U.S. Pat. No. 8,998,462 issued date on Apr. 7, 2015 for Multiple surface LED light which has a rotating LED light device having outlets or electric receiving sockets as disclosed in copending U.S. patent application Ser. No. 12/950,017, filed Nov. 19, 2010;

Which is CIP of (# BB-2008) U.S. application Ser. No. 12/232,035 Filed on Sep. 10, 2008, Publication No. 2009-001-1627 Public date on Jan. 8, 2009, Now is U.S. Pat. No. 7,824,185 Issued date Nov. 2, 2010. (3) (#FFF-2011) an electrical device having a built-in universal USB-unit(s) and outlet-unit(s), as disclosed in copending (# FFF-2011) U.S. patent application Ser. No. 13/117,227, filed May 27, 2011 Pub. No. US 2011/028-7665 date Nov. 24, 2011, Which is CIP of U.S. application Ser. No. 12/502,661 filed on Jul. 12, 2009, which is CIP of U.S. application Ser. No. 12/292,580 filed on Nov. 21, 2008, which is CIP of U.S. application Ser. No. 12/566,322 filed on Sep. 24, 2009, which is CIP of U.S. application Ser. No. 11/498,874 filed on Aug. 4, 2006, which is CIP of U.S. application Ser. No. 11/527,629 filed on Sep. 27, 2006, which is CIP of U.S. application Ser. No. 12/622,000 filed on Nov. 19, 2009, which is CIP of U.S. application Ser. No. 12/624,621 filed on Nov. 24, 2009;

(4) (#GGG-2011) U.S. patent application Ser. No. 13/161,643, filed on Jun. 16, 2011 Publication No. 2011-030-5056 Public date Dec. 15, 2011, Now is U.S. Pat. No. 8,783,936 issue date Jul. 22, 2014; and Desk Top Items with LED has USB-Unit(s) or USB-module to charge other electric or digital data device(s), as disclosed in copending (5) (#R-2007) U.S. application Ser. No. 11/806,285 Filed on May 31, 2007, Publication No. 2007/024-2485 public date Oct. 18, 2007. Now still pending a multiple function LED night light as disclosed in U.S. patent application Ser. No. 11/806,285, filed May 31, 2007. Which is CIP of U.S. application Ser. No. 10/883,747 filed on Jul. 6, 2004, which is CIP of U.S. application Ser. No. 11/092,741, filed on Mar. 30, 2005, which is CIP of U.S. application Ser. No. 11/094,215, filed on Mar. 31, 2005, which is CIP of U.S. application Ser. No. 11/255,981, filed on Oct. 24, 2005, which is CIP of U.S. application Ser. No. 11/527,631, filed on Sep. 27, 2006, which is CIP of U.S. application Ser. No. 11/498,874, filed on Aug. 4, 2006,

BACKGROUND OF THE INVENTION

The current invention relates to USB charger-related products that may include a built-in or added-on or detachable (1) liquid or-and, (2) stationary, or-and (3) rotating/moving, or-and (4) music, or-and (5) physics-motion, or-and (6) plurality of fixed or movable compartment unit on top or lower portion of the said USB charger-related products, For example the said liquid unit has desired of the type disclosed in the inventor's U.S. Pat. Nos. 5,926,440 and 7,909,477, the liquid unit including a liquid medium, decorative-item(s) and miniatures-item(s) filled within the container or compartment(s) for use with different light sources.

The current invention also has subject matter in common with the charger-related products disclosed in the inventor's (# UUU-2013) U.S. patent application Ser. No. 13/870,253, filed on Apr. 25, 2013 (wire arrangement for hand-reachable desktop USB charger-related products) US Publication No. 2014/032-0064 public date on Oct. 30, 2014, Now is U.S. Pat. No. 9,488,364;

(# RRR-2013) U.S. application Ser. No. 13/858,604, filed on Apr. 8, 2013 (wire arrangement for USB charger device having an add-on or built-in wire arrangement-means), Publication No. 2014/030-0322 Public date on Oct. 9, 2014. Now, still pending.

(# SSS-2013) U.S. application Ser. No. 13/863,073, filed on Apr. 15, 2013 (power station having built-in LED-units and USB charger for desktop installation), Publication No. 2014/030-7439 Public date on Oct. 16, 2014. Now, still pending case.

(# TTT-2013) U.S. application Ser. No. 13/870,253, filed on Apr. 25, 2013 (Wire arrangement for hand-reachable USB charger related device) and publication US 2014-032-0063 Public date on Oct. 30, 2014 now is U.S. Pat. No. 9,559,472 issued date on Jan. 31, 2017.

The above-listed parent and co-pending applications all disclose desktop hand-reachable USB-charger related products having wire-arrangements for receiving wires for supplying power to USB-ports, plug receiving sockets, LED-units or any combination thereof to offer people a hand-reachable charger or power supply that can be situated on a desk surface and that further includes a built-in wire arrangement for optimal convenience.

Main features of the charger-related products described in the co-pending applications include:

1. The products are hand-reachable so that there is no need to bend the human body or knee to make use of charging capabilities, thereby preventing people from incurring waist or knee injuries, which is especially useful for aged people.

2. A built-in wire arrangement enables coiling, wrapping, rolling, storage, and/or release of AC power wires or other wires required for USB charger operation as needed, eliminating messes caused by AC wires or other wires.

3. The desktop installation may incorporate attachment-kits, fixing-kits, assembly parts, weight units, or magnetic piece(s) to keep the USB charger related products on a desk top or surface(s) without being moved by the weight of the AC power cord or an incoming force or dropping to the floor, etc.

4. The charger-related products can optionally have a flat and thin but relative large size to have built-in or added above discuss decorative or functional device on top or underlay the said one or more than one receiving-ports' products which people will use on a desk top or surface thereby keeping the desk top nice and neat with no need to make extra space to accommodate the USB charger-related products which has decorative or functional device which people use often such as (1) stationary items, (2) music box, time/or-and date/or-and weather/or-and humility/or weather station, (3) LED light illumination, (4) music box, (5) physics-moving unit, (6) water-ball, (7) seasonal items.

5. The USB charger may have a minimum power output of 1.0 Amp or higher with optional quickly charger system, which is not possible from laptop USB ports or other portable or travel USB chargers, thereby reducing the wait time for charging electric or electronic devices to save people having to wait for fully charged electric or digital data device(s).

6. The wire arrangement may include a roller, retractable means, spring assembly, or twist set, which allow people to keep all charging related wires well stored without creating a mess.

These six features offer people convenience for living.

The current invention also has subject matter in common with the inventor's (# CCC-2010) U.S. application Ser. No. 12/950,017, filed Nov. 29, 2010 (multiple surface LED light with rotating devices having LED light device(s), and USB device(s) and/or outlet device(s) built-in to a rotating substrate with more than one surface to offer multiple functions) and (# R-2007) U.S. application Ser. No. 11/806,285, filed May 31, 2007 (multiple function LED light device); and (# B-2005) U.S. Pat. No. 7,318,652 (multiple function wall cover;

(# F-2005) U.S. Pat. Nos. 7,651,365 and 7,810,985. Each of these patented or pending cases relates to a light source with an outlets device(s).

USB charger-related products are also described in the inventor's (#GGG-2011) U.S. application Ser. No. 13/161,643, filed Jun. 16, 2011 (desk top item with LED means having USB-unit(s) or USB-module(s) to charge other electric or digital-data devices) and (#FFF-2011) U.S. application Ser. No. 13/117,227, filed May 27, 2011 (universal module has USB-unit(s) and/or outlet-unit(s) for a variety of electric or digital-data device).

The current invention differs from the light devices described in the following prior U.S. patents:

Prior Art 1: U.S. Pat. No. 7,736,033 (Bhart) discloses a lamp base with an electric device recharge receptacle, and in particular an outlet device and a cigarette lighter built on a lamp base. The lamp base includes circuitry that transforms an input AC current into a 12V DC automobile current, output, and further includes a plug-in device that transforms the input 12 VDC current into USB end current (5 Volt). This means that Bhart's device at least needs two expensive circuits/transformers to transform the input 120 VAC wall outlets power supply into a USB 5 VDC output. This is not economical and nobody needs a 12 VDC output for household use. In contrast, the present invention directly transforms an input-end 120 VAC into an output-end 5 VDC, which is more practical than the arrangement disclosed by Bhart.

Prior Art 2: U.S. Patent Publication No. 2011/017703 discloses a rotatable and concealable device which only has an outlet device with manual switch. The input 120 VAC power source is connected directly through a metal piece to deliver 120 VAC to the rotatable & concealable device's receptacles to offer 120 VAC current when another device is plugged into the receptacle. The '703 publication fails to disclose any USB charger concept, circuit, design and application, and so is not related to the current invention.

Prior Art 3: U.S. Pat. No. 7,897,277 (Meyer et al.) discloses a reversible battery cartridge which is used to provide backup power for all kinds of lamp and mainly for power fail application. This has nothing to do with USB ports and USB charger applications, and therefore is totally different from the current invention, which is related to a device having (1) USB ports+(2) USB charging+(3) an outlet supply power source+(4) an LED light and universal lamp base to fit for all kinds of existing lamp bases so as not to occupy any new desk top space because (5) the universal desk base overlays a top of the existing lamp base.

Furthermore, the current invention has (6) an LED light incorporated with the above-listed features (1) (2) (3) (4) and (5), so that it becomes a unique practical universal power station, especially because (7) the current invention can be arranged to not only supply one kind of power to a charger, but also can supply different types of power to different electric or digital-data device(s).

Prior Art 4: U.S. Pat. No. 6,474,823 discloses a laptop computer with a top illumination light. The computer uses a transformer to converting input AC power into 5 Volt DC current for internal use. However, there is no USB charger circuit inside the computer. Instead, the computer's external transformer directly delivers 5 VDC current to the USB port, so the computer system of this patent differs from the charger products of the current invention, which uses an internal USB charger circuit to convert 120 VAC into a 5 VDC USB charging output. As disclosed in this patent, the computer itself has an input-end current of 5 VDC and output-end current at the USB ports that is also 5 VDC so there is no need for a USB charger circuit inside.

Prior Art 5: US 2015/002-8797 Public date Jan. 29, 2015 Miller et. A1 disclosure the portable power charger with power input and power output connection interfaces. The U.S. application Ser. No. 14/220,607 filed on Mar. 20, 2014 which is provision Application No. 61/803,500 filed on Mar. 20, 3013, provision application of 61/865,891 filed on Aug. 14, 2013, both filed date is much later than above listed (FFF-2013) (CCC-2010) (B-2005) (R-2007). So Miller device is invalid filed case.

Prior Art: US 2014/023-2341 Public date Aug. 21, 2014 Ikegami (NEC) for Charging stand which has built-in male-plug for only same female-receiving ports can be charged for only one build-in male-plug. This is not same as current invention and all parent filed cases for universal application which USB ports or hub-ports or other female receiving-ends can fit all be-charged device and its connection-wire's male-plug. Also, the Ikegami '341 filed on Oct. 2, 2012 which is much later than current invention and all parent filed case for much earlier date, so '341 is a invalide patent for desktop charging stand is much later filed date than co-inventor's (# CCC-2010) (# R-2007).

Prior Art: US 2011/008-4651 Caskey et. al Public date Apr. 14, 2011 which U.S. application Ser. No. 12/924,875 filed on Oct. 7, 2010 which is Provisional application No. 61/278,582 filed on Oct. 8, 2009 which is filed on later date than current invention's parent filed case (# CCC-2010) or (#R-2007) which still pending and filed date on 2010 and 2007. Furthermore, Caskey '651 show the wire arrangement for wall mounted USB charger and outlets. The Outlet for Plug-in LED light already disclosure on current invention's parent filed case (R-2007) as above listed details for filed-date, public-date. So Caskey '651 is invalid patent.

Basing on all above discussed and described differences of all prior-arts, the current invention and all parent filed cases are the 1st invention and also has at least the following advantages:

A. It offers the most convenient way to use USB ports and/or other power outlets and LED units on a desk surface within a hand-reachable distance.

The current invention allows all power stations or products to be installed on the desk top very steadily and overcome the super heavy duty weight of the power cord, which extends from the wall outlet to the power station or products and exerts a pulling as a result of the cord's weight.

The normal design for all marketed extension cords with built-in outlets or additional features such as USB ports, Slim arms of single piece LED source, audio-ports, video-ports, internet-ports, or other electric device's ports is not capable of being put on a desk top because the power-cord's weight is way too heavy and cord's weight will pull off the existing market any extension-cord or power-strip off the desk surface at once. The said cord if the outlet's power cords meet safety authorities' requirement that power cords have to use 10, 12, 14, or 16 gauge wire. Such a very heavy duty cord, which may have different lengths of from 1 foot to 100 feet is impossible to install on a desk top.

Furthermore, In old time that a conventional outlet device does not really need to be put on a desk top because there are too few occasions to plug or unplug the plugs of electric or electronic devices into or from the outlet device. But now, People use laptop and portable phone need to use not only outlet daily while people use laptop at home after they carried from office or other place need use outlet times a day, so it is need outlet can use on desktop.

However, the current invention has built-in USB or-and Outlet or-and other receiving ports or-and LED light device, for which there is a need to connect to the USB or-and Outlet-ports or turn on-off the said LED unit(s) many times per day or at least once a day because of the many devices, such as cellphones, mobile phones, smartphones, iPads, and panel communication or consumer computer devices that need to be charged from USB ports. The current invention offers the most convenient way to put the USB-ports and LED units on the desk top so that people do not need to bend the body and knees to connect a device to a grounded multiple function extension cord or wall mounted USB ports for charging.

This is the major concept for the current and all the parent co-pending invention.

B. The current invention offers a simple way to install a power station or products on a desk surface so that people do not need to bend their body or knee to carry out a charging operation and thereby prevent injury or damage to the human waist and knee.

C. The power station can be adapted to include the unique features described in the inventor's parent or-and co-pending U.S. patent filings in order to supply power to charge the majority of electric, digital-data, audio, video, or internet devices on a desk top without the need to frequently bend the body to or near the ground when connecting to a power source via an outlet or USB port, or making use of an LED unit.

The current invention may also be applied to the following:

(A) a rotating LED light device having outlets or electric receiving sockets as disclosed in co-pending U.S. patent application Ser. No. 12/950,017, filed Nov. 19, 2010;

(B) an electrical device having a built-in universal USB-unit(s) and outlet-unit(s), as disclosed in co-pending U.S. patent application Ser. No. 13/117,227, filed May 27, 2011;

(C) a desk top LED device having a USB-unit(s) or outlet-unit(s) to charge an electric or digital device, as disclosed in co-pending U.S. patent application Ser. No. 13/161,643, filed Jun. 16, 2011; and (D) a multiple function LED night light as disclosed in U.S. patent application Ser. No. 11/806,285, filed May 31, 2007.

The current invention may also use the following concepts described in the following LED-related filing cases of the inventor: (1) a project light, (2) more than one function, (3) adjustable focus, (4) adjustable angle, (5) elastic contact points, (6) an LED heat solution, (7) heat sensitive parts installation, and (8) extend means, which are disclosed in the inventor's U.S. patent application Ser. Nos. 13/367,758; 13/367,687; 13/296,508; 13/295,301; 13/021,107; 12/950,017; 12/938,564; 12/886,832; 12/876,507; 12/771,003; 13/021,124; 12/624,621; 12/622,000; 12/318,470; 12/914,584; 12/834,435; 12/292,153; 12/907,443; 12/232,505; 11/806,711; and Ser. No. 11/806,285.

The eight listed concepts are also disclosed in the inventor's U.S. patent application Ser. No. 13/295,301 ("The Device has built-in Digital Data means and Powered by unlimited power source of light device"); Ser. No. 13/296,508 ("The Device has build-in Digital Data means and power unlimited power source of LED Bulb"); Ser. No. 13/296,460 ("The device has build-in Digital data means and powered by unlimited power source of Lamp Holder"); Ser. No. 12/951,501 ("Lamp Holder has built-in LED Night light"); Ser. No. 12/950,017 ("Multiple surface LED light"); Ser. No. 13/162,824 ("Light device with display means has track-means and removable LED-unit(s)"); Ser. No. 12/938,628 ("LED light fixture has outlet(s) and removable LED unit(s)"); Ser. No. 12/887,700 ("Light fixture with self-power removable LED unit(s)"); Ser. No. 12/149,963, now U.S. Pat. No. 7,722,230); Ser. No. 12/073,095 (now U.S. Pat. No. 7,726,869); Ser. No. 12/073,889; Ser. No. 12/007,076 (now U.S. Pat. No. 7,726,841); Ser. No. 12/003,691 (now U.S. Pat. No. 7,726,839), and Ser. No. 12/894,865.

In addition to the above, light device related patent applications of the inventor include U.S. patent application Ser. Nos. 13/295,301; 13/296,469; 12/624,621; 12/622,100; 12/318,471; 12/318,470; 12/318,473; 12/292,153; 12/232,505; 12/232,035; 12/149,963; 12/149,964; 12/073,095; 12/073,889; 12/007,076; 12/003,691; 12/003,809; 11/806,711; 11/806,285; 11/806,284; 11/566,322; 11/527,628; 11/527,629; 11/498,874; 12/545,992; 12/806,711; 12/806,285; 12/806,284; 12/566,322; 12/527,628; 12/527,629; 12/527,631; 12/502,661; 11/498,881; 11/255,981; 11/184,771; 11/152,063; 11/094,215; 11/092,742; 11/092,741; 11/094,156; 11/094,155; 10/954,189; 10/902,123; 10/883,719; 10/883,747; 10/341,519; 12/545,992; 12/292,580; 12/710,918; 12/624,621; 12/622,000; 12/318,471; 12/318,470; 12/318,473; 12/292,153; 12/710,561; 12/710,918; 12/711,456; and Ser. No. 12/771,003.

The present invention may also utilize concepts described in the inventor's U.S. patent application Ser. No. 13/295,301 ("The Device has built-in digital data means and powered by unlimited power source for Lamp holder"); Ser. No. 13/296,469 ("Device has built-in digital data means and powered by unlimited power source for light Device"); Ser. No. 12/951,501 ("Lamp Holder has built-in LED light"); Ser. No. 12/771,003 ("LED light has geometric-unit(s) incorporated project means"); Ser. No. 12/711,456 ("LED power failure Light"), Ser. No. 12/710,561 ("LED light device has special effects"); Ser. No. 12/710,918 ("LED light device has more than 1 reflective means for plurality of image"); Ser. No. 12/624,621 ("projection device or assembly for variety of LED light"); Ser. No. 12/622,000 ("Interchangeable Universal Kits for all LED light"); Ser. No. 12/318,471 ("LED night light with pinhole imaging"); Ser. No. 12/318,470 ("LED night light with Projection features"); Ser. No. 12/318,473 ("LED night light with laser or hologram element"); Ser. No. 12/292,153 ("LED night light with Projection or imaging features"); Ser. No. 12/232,505 ("LED night light with Projection features"); Ser. No. 12/149,963 ("Removable LED light device") Ser. No. 12/149,964 ("Surface Mounted device with LED light"); Ser. No. 12/073,095 ("LED Track light device"); Ser. No. 12/073,889 ("LED light with changeable position with Preferable power source"); Ser. No. 12/007,076 ("LED light with changeable geometric system"); Ser. No. 12/003,691 ("LED light with changeable geometric dimension features"); Ser. No. 12/003,809 ("LED light with changeable features") Ser. No. 11/806,711 ("Multiple LED light with adjustable angle features"); Ser. No. 11/806,285 ("LED Night light with outlet device"); Ser. No. 11/806,284 ("LED Night light with more than 1 optics means"); Ser. No. 11/527,628 ("Multiple function Night light with air freshener"); Ser. No. 11/527,629 ("LED Night light with interchangeable display unit") Ser. No. 11/498,874 ("Area illumination Night light"); Ser. No. 11/527,631 ("LED Time piece night light"); Ser. No. 12/545,992 ("LED time piece Night light"); Ser. No. 12/292,580 ("LED Time Piece Night light"); Ser. No. 11/498,881 ("Poly Night light"); Ser. No. 11/255,981 ("Multiple light source Night Light"); Ser. No. 11/184,771 ("Light Device with EL elements"); Ser. No. 11/152,063 ("Outlet adaptor with EL"); Ser. No. 11/094,215 ("LED night light with liquid medium"); Ser. No. 11/094,215 ("LED Night light with Liquid optics medium"); Ser. No. 11/092,741 ("Night light with fiber optics"); Ser. No. 10/883,747 ("Fiber Optic light kits for footwear"); Ser. No. 11/498,874 ("Area Illumination for LED night light"); Ser. No. 11/527,629 "(Time Piece with LED night light"); Ser. No. 11/527,628 ("Multiple Function Night light with Air Freshener"); Ser. No. 11/806,284 ("LED Night light with more than one optics mediums"); Ser. No. 11/806,285 ("LED Night Light with multiple function"); and Ser. No. 11/806,711 ("Multiple LEDs Light with adjustable angle function").

The inclusion of any of the features disclosed in the above-listed U.S. patent applications of the inventor still fall within the scope of the current invention and all related equivalent functions or replacement parts also should fall within the current invention's scope.

The current invention relates to a wire arrangement for hand-reachable desktop USB charger related products. The term "USB charger related products" relates to products that at least have one USB charger with its receiving-means and any combination of additional market-available electric or electronic parts and accessories to form a single or plurality of function(s) device that can be placed on a desktop to offer people convenience without bending the body or knee to connected a device for charging.

BRIEF DESCRIPTION OF THE DRAWINGS

FIGS. 1, 1-1, 2, 2-1, 2-2, 2-3, 3, 4, 5, 5-1 6, 6-1, and 7 are isometric views showing different applications of USB charger related products having built-in liquid and display units for respective paper weight, pen holder, magnetic device, key compartment, and stationary applications for a desktop, each with a built-in USB charger with AC power wires and/or USB digital data wires for connection to USB ports of an external computer, communication device, or consumer electric product.

Figure 7:
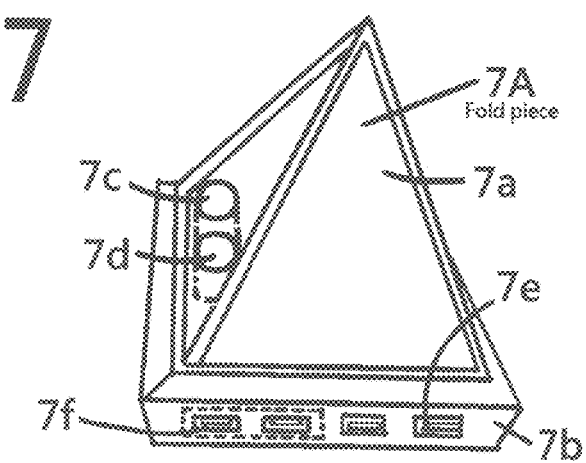
Figure 7A:
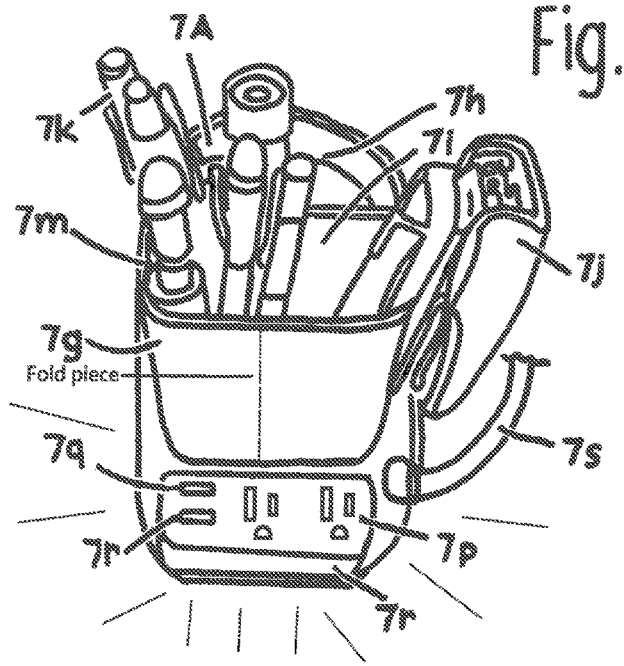
Figure 7B:
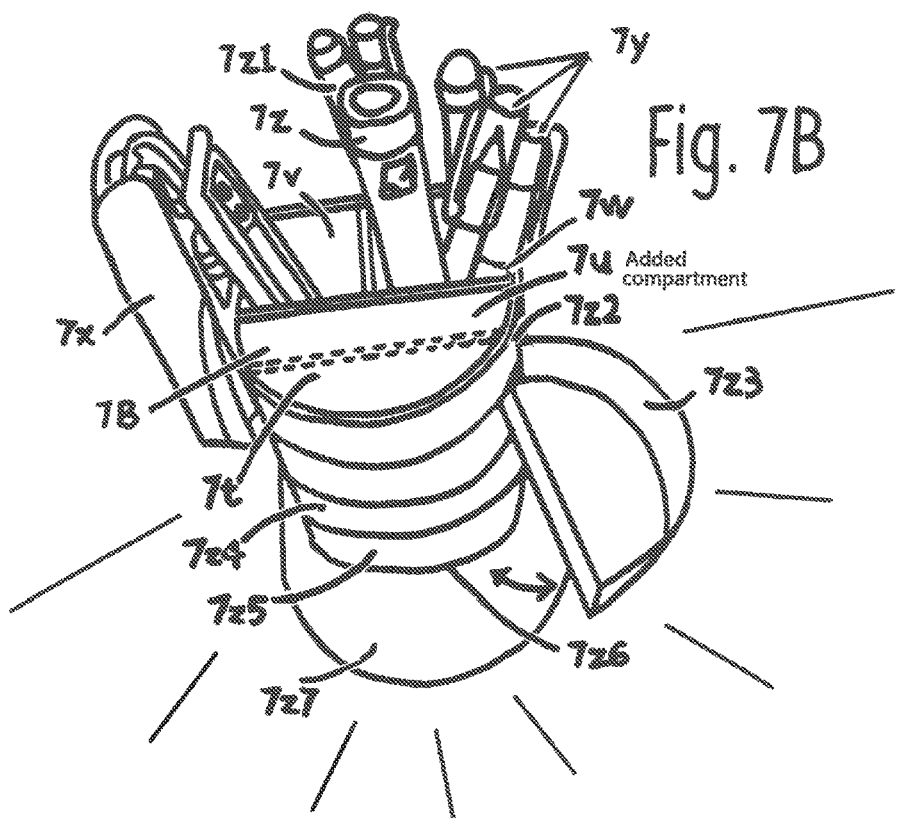
Figure 7F:
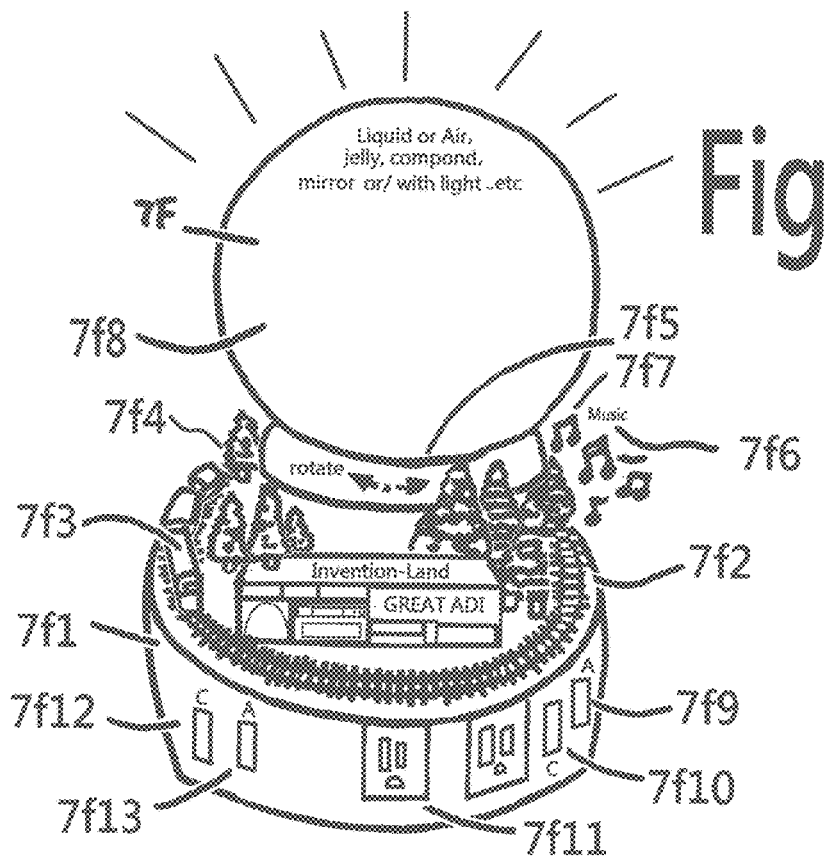
Figure 7G:
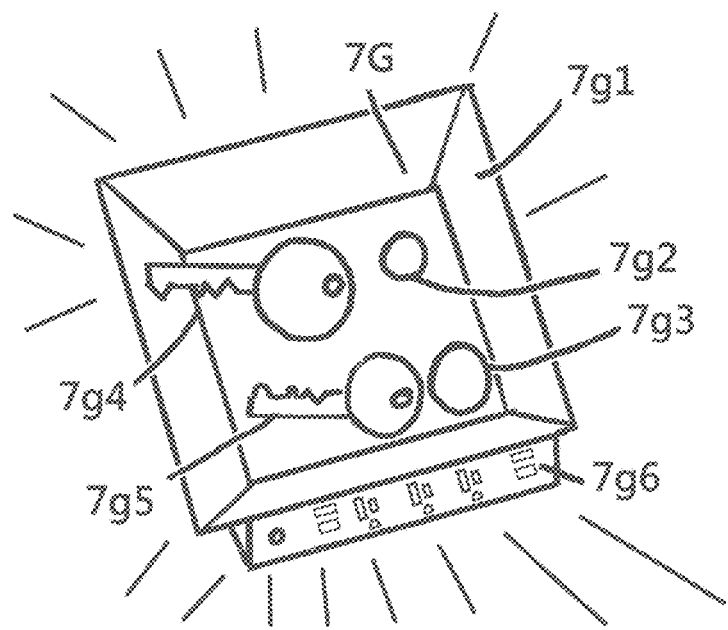

From FIGS. 7A, 7B, 7C, 7D, 7E, 7F, 7G show the built-in or added-on other functional application(s) on top or below the said USB, or-and Outlet, or-and other female-receiving-ends device for (1) stationary FIGS. 7A to 7D, or-and (2) plurality compartment(s) with fixed or movable compartment as FIGS. 7B and 7C, or-and (3) Key or coin or phone tray as FIG. 7G, or-and (4) Physics-moving device FIG. 7E, or-and (5) Music device or-and moving-device or-and tracked-device with moving unit(s) as FIG. 7F.

Figure 8:
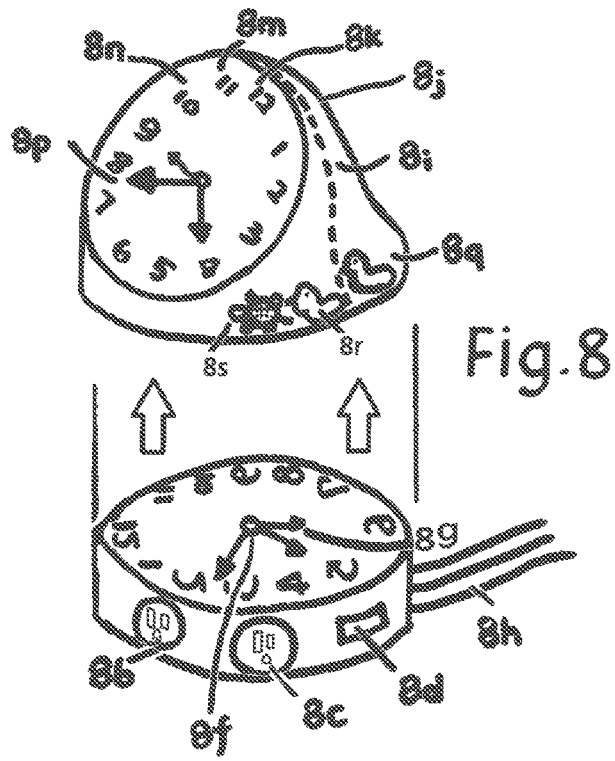
Figure 9:
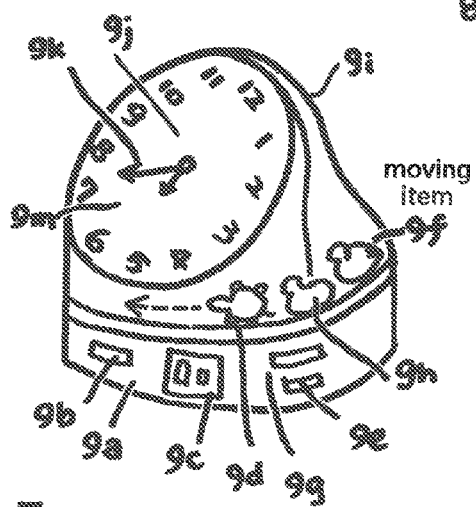
Figure 10:
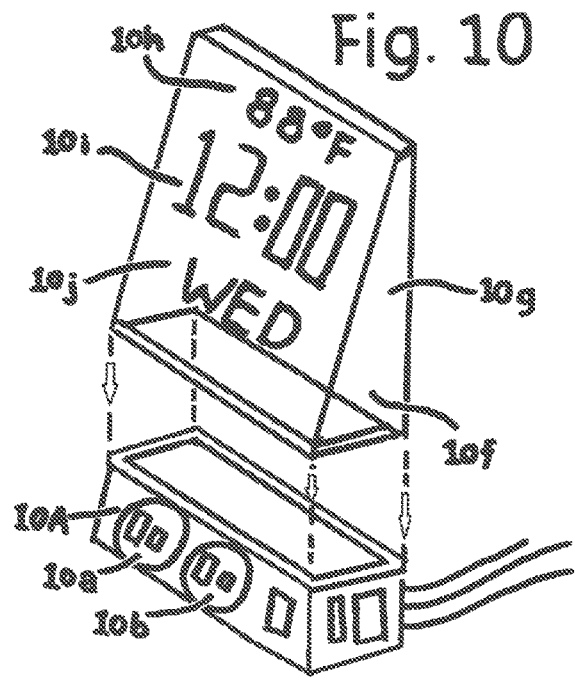

FIGS. 8,9,10 and FIGS. 11a, 11b, 11c, 11d, and FIGS. 12, 13, 14, 15, 16 show other application for desired functions which has LED lighting devices to which the principles of the parent or current present inventions. From FIGS. 8 and 9 and 10 show the time, or-and date, or-and week/month/year, or-and weather station, or-and moving-unit incorporated with time piece and magnify-liquid device. FIGS. 11 to 16 show the USB or-and outlet incorporated with LED light source.

FIGS. 17, 17A, 17B show the USB or-and outlet device incorporated with Lava or glitter or reflector or shaped miniature-items inside container to put on top or below the said USB or-and outlet device.

DETAILED DESCRIPTION OF THE PREFERRED EMBODIMENTS

The current invention relates to USB charger related products having built-in or add-on liquid-containing unit, or-and stationary, or-and physics-moving set, or-and time/date/week/year/weather, or-and music-assembly, or-and moving-device, or-and track-assembly. The said liquid-containing unit which may be similar to those described in the inventor's U.S. Pat. Nos. 5,926,440 and 7,909,477. U.S. Pat. No. 5,926,440 discloses a liquid-containing display unit with decorative or miniature-means and magnetic-means incorporated with an EL light and a time piece. U.S. Pat. No. 7,909,477 discloses a liquid-containing display unit with decorative or miniature-means and optional heater-means that cause the fluid to move or magnify effects of reflective pieces or characters included therein to provide eye-catching effects, performance, or functions.

Figure 1:
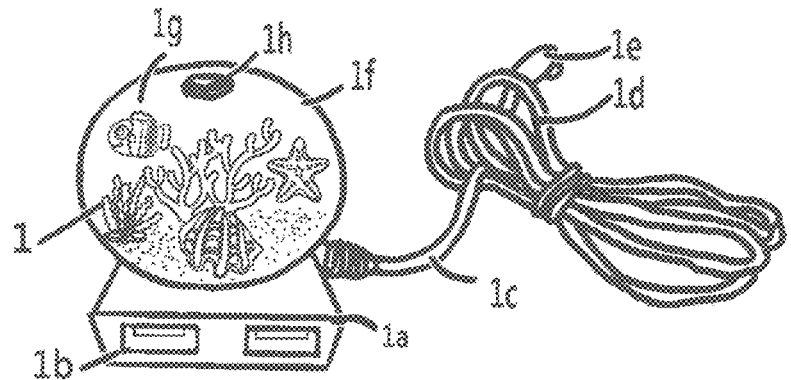
Figure 1:
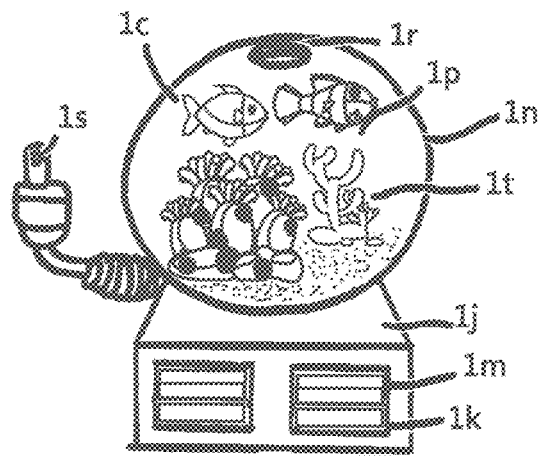

As shown in FIG. 1, a first preferred embodiment includes a medium in the form of a liquid, fluid, oil, water, compound, gel, liquid-to-solid, or solid-to-liquid fills a geometric container to magnify an inner decorative-items, reflective-items, miniature-units, character-unit(s), or any other item(s) available from the market place and that be including the medium means to be seen by a viewer and to provide desired functions, performance, and effects.

FIG. 1*a* shows a variation of the first preferred embodiment (1*f*) with four rather than two USB ports (1*b*) on the base (1*a*). In general, the USB-charger related products (1*f*) of the current invention may be used for desktop applications that include decoration or functional items built-in or add-on top or below the said USB-device stationary as FIGS. 7A to 7D, desk light as FIGS. 11 to 16, and USB-charger devices in desired geometric shape (FIGS. 1 to 17B) the form of or in any combination selected from a paper-weight as FIG. 7A, weighted clip, pen-holder set as FIGS. 7A to 7D, magnetic means for metal paper clips as FIG. 3, multiple USB-ports for a USB-signal divider (here after as hub), key, coin, phone, Key-chain compartment as FIG. 7G, USB lighting device as FIGS. 11 to 16, and desk lighting as FIGS. 11 to 16, the charger related products including a built-in container as FIG. 1 and FIG. 1-1 filled with a medium, decorative-unit, display-piece, miniature items, liquid, gel, water, salt water, oil or any other solid-to-liquid or liquid-to-solid material.

The current invention may include both (1) a USB-charger with an AC power wire to connect with an AC Power source having a range of 110/250 AC, and (2) a USB-signal divider (hub) with a USB plug-wire to connect with a computer signal output-end to connect to a printer, removable memory means, external DVD, scanner, ATM reader, and card reader for a digital-data connector.

From FIG. 1 show the container (1f) has liquid (1g) filled up and has plurality minatures-items (1i) for desired combination. The said container can be a built-in or add-on item to fixed or install on the top of the USB-charger unit (1a) which has AC plug wire or USB wires to get power source to make the USB-ports (1b) or other female port(s) to supply or delivery the power or electric signals to other device.

From FIG. 1-1 the container or compartment (1n) has inner medium (1p) and plurality of miniature-items (1q) (1t) arranged inside the compartment (1n). The container or compartment (1n) fixed or installed on top of the below USB-charger unit (1j) which has the desired number of female receiving-port(s) for desired combination including USB-ports, Outlet ports, audio-port, blue-tooth input-port, or other female receiving-port(s) to receive the male plug for desired functions for input or output power or electric-signal (s).

Figure 2:
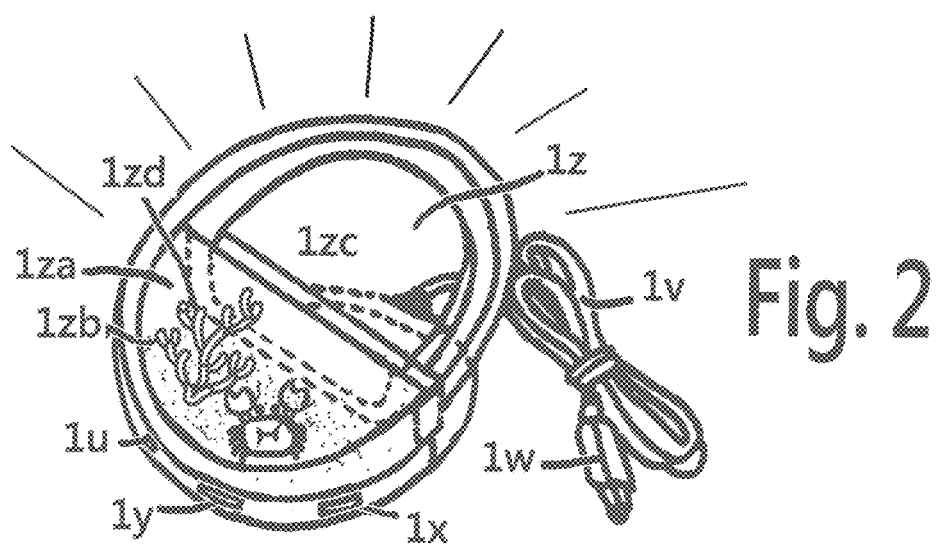
Figures 1, 2:
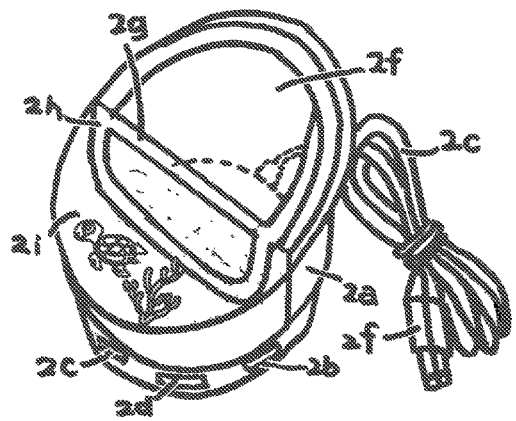
Figure 2:
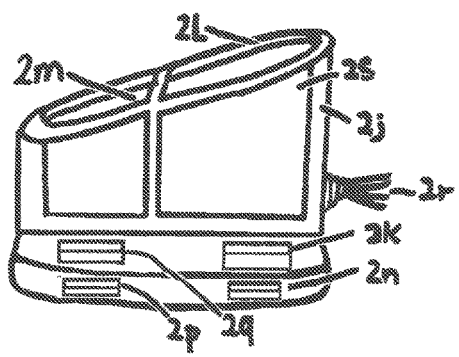
Figures 2, 3:
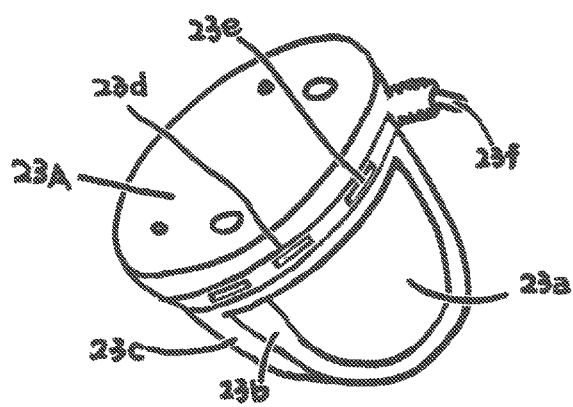

FIGS. 2 and 2-1 and 2-2 and 2-3 shows second preferred embodiment in which the USB charger related product is in the form of a cut cylinder shape with a compartment (1z) (See FIG. 2) to let people store something within such as a stapler-pin, metal paper clip, keys, nails, pins, hair clippers, and so forth, and which also has sufficient weight to become a paperweight as needed. The inner compartment (1za) may be filled with a liquid be containing decorative item (1zb) or miniatures (1zb). As shown in FIG. 2, USB signal-wires may be connected to the base of the product. However, as shown in FIG. 2, AC power-wire (1v) and preferred male-plug (1w) may also be used to supply power to the USB related product circuitry (not shown) to supply power to the USB ports (1u) (1y).

The compartment (1za) of FIG. 2 and The compartment (2h) of FIG. 2-1 may be filled up with leaves, shells, miniature fish (2i) within the media which is liquid to cause the miniature fish (2i), leaves, shell, sand, etc. to appear larger than the actual size to enable people to enjoy an aquarium-tank on the desk top.

As shown in FIG. 2-2, the USB charger related product (2j) may include four USB-ports (2p) (2q) situated below the compartment (2j). The USB ports may have a charger function rather than USB digital-data connector (hub) or divider (hub) functions. In that case, all four USB ports (2p)(2q) may be output-ends for DC current having at least 1 Amp to charge other electric or digital-data device(s) when the other device's male-plug (not shown) is inserted into any one of the four USB-ports.

From FIG. 2-2 show the USB charger related product has more than one compartment (2m) (2L) for desired arrangement. The compartment in front (2m) is for decorative function and the compartment on back (2l) is for storage function such as stationary-item(s), key, coin, hair-clipper, paper-clip, staple, pen or whatever people like to put into.

From FIGS. 2-1, 2-2, 2-3 shows wire arrangements for the current invention, including an AC power wire (2e) (2r) (23f) that can be put on the bottom or just arranged to come out from a side wall to connect with an AC power source.

The USB charger related product also has built-in or added-on decorative or functional units or-and digital data ports (Hub) to enable digital-data delivery as well as electric-power delivery.

From FIG. 2-3 show the USB charger related products (23A) has divider (23b) to make preferred space into desired number of compartment(s) for decorative or storage or moving or presentation function(s). The $1^{st}$ compartment (23a) on rear is storage items space, the $2^{nd}$ compartment (23c) in front so can make a decorative or moving or presentation functions. The USB-ports (23d) (23e) of USB charger related product (23A) which get AC or DC input-power from the wire (23f) with preferred male-plug to connect with AC-outlet or outside AC-to-DC transformer.

FIG. 3 shows a magnetic desktop paper-weight (3a) that has (a) an AC power-wire which connect with AC outlet, or (b) AC-to-DC power wire which connect with outside transformer. Both supply power to three USB charger ports (3f) (3e) through USB charger related product (3a) inner circuitry supply DC current to USB-port(s) to charge other electric or digital-data devices as in the above-described embodiments.

The desktop paper-weight includes a central concave (3g) arrangement with magnetic so can make magnetic-force apply to all metal relative piece such metal paper clipper (3h), stapler's pin or other metal keys on position to easily to use.

The AC power-wire as (2e) of FIG. 1, or as (1s) of FIG. 1-1, or as (2r) of FIG. 2-2, or as (23f) of FIG. 2-3 can also be stored under the charger unit (1a) (1j) (2a) (23A) as described in the above-cited patent applications of the inventor or shown on the FIG. 7D) ditch (7d2), groove (7d3). Furthermore, the charger product can have an optional outlets device as (7p) of FIG. 7A, or as (7c2) of FIG. 7C, or air-freshener (not shown) to provide the desk top products with desired air-flavor function in addition to the USB charger function, or music-related functions from the build-in circuitry and speaker with IC or blue-tooth or play system (3e) of FIG. 3.

FIG. 4 shows seasonal desk top items (4A) (4B) having USB or-and Hub ports (4d) (4d') for receiving signal-data or-and signal-power connectors, USB charger ports for charging other devices, and also built-in outlet-units (4e) (4e') to serve as an AC power source to supply AC power to other AC operated products. The seasonal desk top items (4A) (4B) also optional or preferred to have built-in liquid medium (4b) (4b') with miniatures (4c) (4c'), glitter, reflectors, leaves, floating items, characters, and cartoons with or without heater-unit(s) (not shown) to cause salt-water (4b) (4b') or chemical compounds (4b) (4b') to flow and cause the glitter (4c) (4c'), inner miniatures, decorative items, or reflectors to move. It will also be appreciated that the heater-unit(s) (not shown) may take the form of inner circuit (not shown) such as a transformer, inductor, resistor, capacitor, or other parts or accessories also can generate heat.

From FIG. 4 show seasonal desktop items (4A) (4B) including all kind of seasons like valentine, Halloween, Thanks Giving, Birthday, party, celebration . . . etc, it may incorporated with motor, moving device, joints, arms, bars, stuffing, air-blow with Fan to make the said Seasonal desktop items (4A) (4B) to be moved, or floating, or shaking, or vibration, or rotating, or spin to present the decorative, or motion, or animation, or rotating, or moving effect or functions on top of the USB charger related products.

Figure 5:
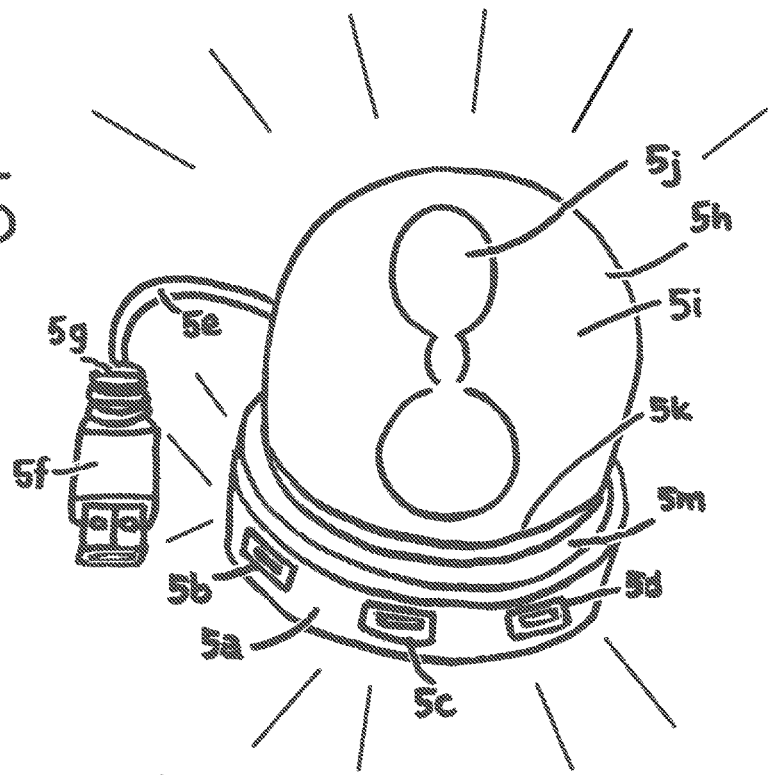
Figures 1, 5:
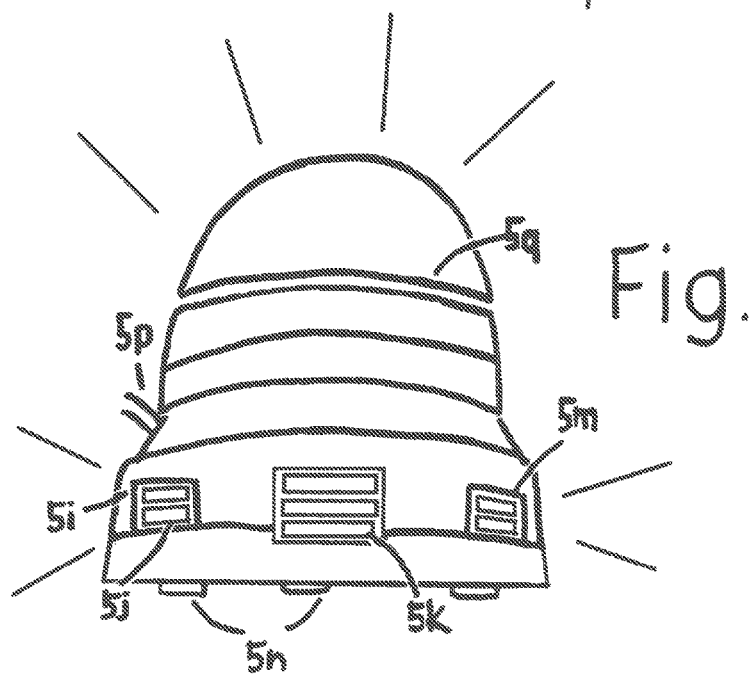

FIG. 5 shows another embodiment having USB ports (5c) (5d) and Hub-port (5b) to deliver (a) electric-power or (b) digital-data via USB-power-wires or-and USB-hub-wire (5e) to other products. An USB charger related products incorporated with USB charging ports (5c) (5d) get power via AC or DC power cord (Se) with preferred AC male-plug (not shown), or DC or-and Hub USB male-plug (50. As a result of the Hub (5b) is a data delivery ports, the limited number of computer has sufficient number of the USB-HUB ports to enable handle the digital-data to be obtained or delivered between the the computer, or portable hard-disc, or backup-disc, or camera, or audio system. The current invention thus provides a USB charger related product that not only has a built-in or added-on function or decorative unit(s), but that also includes both USB charging-ports (5c) (5d), or-and USB Hub-ports (5b), or-and combination for USB-units can deliver both the electric-power for power delivery and digital-data for data delivery. The choice for single power-delivery USB, or single digital-data delivery hub, or combination 2 type delivery USB-unit depend on consumer what they want to pay for.

From FIG. 5 show the compartment has the more than one medium and one medium (5j) is floating within the other medium (5h). This kind of decorative or moving effects function unit (5j) (5h) has light-source or-and heater-unit(s) under the compartment. This kind of decorative or-and function unit is popular at market place called lava light.

From FIG. 5-1 show the different construction built-in or added-on top decorative or-and functional unit (5q) which has plurality of compartments which may in high-and-low (vertical) or-and right-and-left (horizon) or combination of vertical or-and horizon compartments arrangement. The each compartment has desired decorative or-and functional design, content, appearance, functions. The base (5i) has USB-power unit or-and USB-hub-units to make different functions for consumers and offer convenience.

Furthermore, The USB charger related products as above discussed, the alternative embodiment preferred has more than one wire, one of which is an AC power wire to connect with an AC power source to provide power to a USB charger circuit that converts the AC power to a DC power current to charge other devices. The second of more than one wires is a digital-data (hub) wire that delivers the digital-data including photos, picture, all kind of files, words, excel input into or download to other storage device from the computer. The current invention has the USB-power ports and USB-Hub ports that compare with market single USB-power port(s) which lack of some low-cost USB-Hub ports is other features for current invention. The current invention not only has USB-power ports, but also has a plurality of USB-hub ports that can connect computer and many of external computer related devices such as a printer, scanner, external hard disc, game, speaker, camera, iPad, iPhone, download means, memory means, VCR, DVD, or other computer, communication, or consumer electric device on the desk-top to save people to buy 1 to N simple USB-hub ports cost. The features is single USB-hub port or connector which only has 2 conductive-piece to delivery digital-data and is much cheaper than USB-port has both power and digital-data functions which need 4 conductive-piece.

Figure 6:
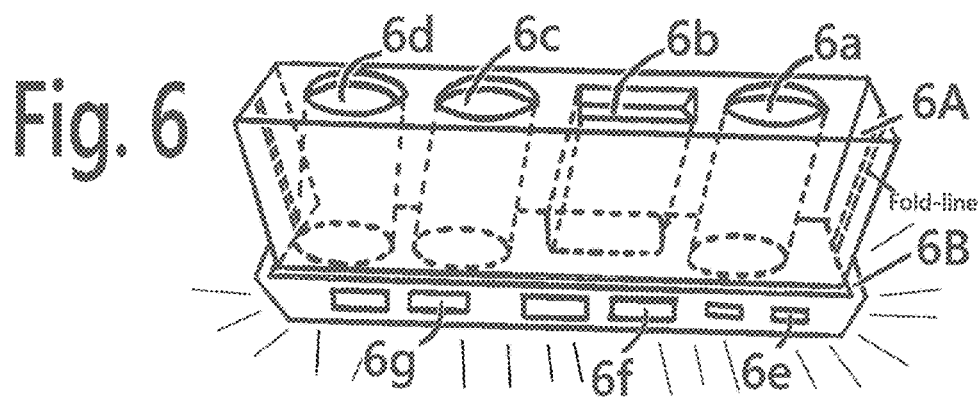
Figures 1, 6:
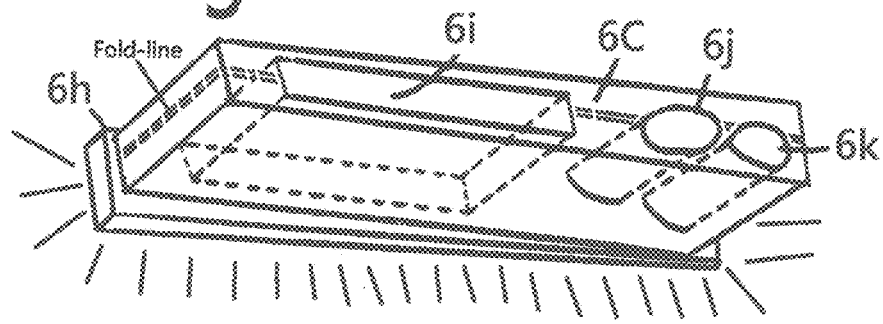

FIGS. 6, 6-1, and 7 show different shapes of USB charger related products having built-in or added-on decorative or functional unit(s) (6A) (6C) (7A) on top or below the said USB charger related products. The said decorative or functional units (6A) (6C)(7A) for different applications, such as stationary compartment (6A) (6C) (7A) which has plurality of compartments to put pen, paper, notes, eraser, correction tap, weight or-and staple or other all kind of stationary. The USB charger relative products may has more than one electric wire to connect with both a computer related products and other digital storage device, or-and digital-data source, or-and print, storage, download digital data device, or-and an AC power source to provided multiple functions.

From FIGS. 7A, 7B, 7C, 7D show the preferred USB charger related productsv (7A) having a built-in or added-on decorative or-and function unit(s) (7g) on top or below the USB charger-unit, as described above, may further include at least one LED light-source as well as related circuit, IC, switch, and/or sensor to offer desired LED light show or simple illumination with predetermined timing, functions, brightness, colors, and duration or-and high-low multiple brightness, auto changing color with select color, motion sensor or-and time delay period time, motion or non-motion for motion selection function, fade-in and fade-out functions, chasing, sequential, mixed color or and other LED light functions available from market place.

From FIG. 7A show the USB-Charger related product (7A) has USB charger-unit which has USB-charger unit or-and USB-hub unit (7q) (7r) and outlet (7n) (7p) which on the front of the USB-Charger unit. The USB Charger-unit has recess areas where the decorative or-and functional unit installed or added-on the recess area and it is a stationary compartment (7g) which can be any construction for one (7i) or more than one compartments (7i) (7h) to hold the stationary or daily use items which is a (a) staple (7j), (b) marker pen (7k1), (c) Pencil (7k), (d) ball pen (7k2), (e) fountain pen (7m), or (f) other staple pin, paper clipper, earing, coin, key, bracelet, pendent or other small personal items to put into or hold, so people not only can have the USB-ports to supply power or-and delivery digital data (hub) but also has one compartment-set to arrange all the stationary or-and personal items with or without optional LED light functions. This offer people very convenience to get AC or-and DC power and have good compartment-assembly with preferred decorative or-and functional unit to well arrange the desktop items in nice and net without occupied by separated compartment and separated USB-Charger related items for 2 items to occupy limited desktop surface.

From FIG. 7B show the back side of FIG. A USB charger related products has base (7z7) has recess area for built-in or added-on top decorative or-and functional compartment assembly (7B) which has more than one of compartments (7z2) (7z3) (7z4) (7z5) and some of the compartment (7z3) is movable or rotatable or detachable so can let people to open and put items into and close back to cylinder. Top compartment (7z2) which is on the top position which has several dividers to make top compartment divided into 3 space (7u) (7v) (7w) and each space can put different size, length, items such as staple (7x), marker pen (7z), ball pen (7z1), automatic pencil (7y), eraser, staple-pin, paper clip, hair clip, coin, key, portable USB, power bank, earing, bracelet, necklace, ring . . . etc. The said movable, rotatable, detachable for built-in or added-on compartment(s) can be arranged for horizon (right and left) or-and vertical (top and low) relative relation to meet all different requirement from market place. And Each compartment has desired movable or changeable divider to make preferred space(s) need by different person. The compartment-assembly also can be any geometric shape for special requirement.

From FIG. 7C show the Front of FIG. 7B which has decorative or-and functional unit (7C) has more than one of the compartment(s) (7c6) (7c7) to built-in or added-on the recess or designed area of USB-charger unit (7c1) which has the USB-ports for different function or size or specification including Type A USB-port (7c3), Type C USB-port (7c4), micro SD card port (7c5), or Androi USB-port (7c3) so can have all kind of male-USB plug for market mobile phone or pad or flash-disk can fit into USB-Charger unit ports so can make sure the device can work for any person who had different mobile phone, pad, flash-USB, camera, audio device, power bank or USB-related wires set can work with the said current USB-charger unit ports.

From FIG. 7D show other optional features which is same as co-invention parent (# TTT-2013) U.S. application Ser. No. 13/870,253, filed on Apr. 25, 2013 (Wire arrangement for hand-reachable USB charger related device) and publication US 2014-032-0063 Public date on Oct. 30, 2014 now is U.S. Pat. No. 9,559,472 issued date on Jan. 31, 2017. The FIG. 7D has decorative or-and functional unit (7d4) on top of the USB-charger unit base (7D) that has one small size than base contour base-plate (7d1) so has groove or ditch or gap (7d2) (7d3) surrounding whole contour of the base (7D). Not only the groove, ditch, gap (7d2) (7d3) can coil the wire but also the space under the base-plate (7d1) has big space to make the wire coil sround the center screw-bar so this design can coil or wrap or hidden the wires for sufficient length and the wire came out from wire out-channel (7d5). Some application the coil or wrap wire incorporated with the elastic spring, or manual-coil bar for quickly coil or wrap wire by spring-force or hand-rolling force for easily coil or wrap wire into the gap, groove, ditch and big space under the base-plate (7d1).

From FIG. 7E show the other people preferred desktop items which is physics-moving device, the decorative or-and functional unit (7E) has multiple door shape bar in (11) shape bar (7e1) (7e2) (7e3) and has wire to hold the metal ball (7e4) and move the ball (7e4) to high-position and release it, The ball (7e4) will hit the $2^{nd}$ ball (7e5) and then ball (7e5) to hit the next $3^{rd}$ ball (7e6), then, the ball (7e6) to hit the next $4^{th}$ ball (7e7) and change position from vertical to horizon high position (7e8), then reverse the procedure. This is one of physic-item to make people watching. This is one of type of people preferred desktop items which has USB-Charger unit (not shown) on base so can offer supply power or delivery digital-data by one or more than one USB-ports or-and outlets or-and LED light kits to offer multiple decorative or-and functional unit.

From FIG. 7F, Show the Desktop USB charger related products (7F) has the USB charge-unit on base which has the More than one of USB-ports (7/9) (7/10)(7/12)(7/13) or AC-outlets (7/11) to (1) supply DC power to other products from USB-ports (7/9)(7/10) (7/12) (7/13), or supply AC power to other products from AC-outlet(s)(7/11)

(2) deliver or distribute the digital-data between multiple of digital-device(s) by USB-hub units (7/9) (7/10) (7/12) (7/13), (3) Charger built-in battery of the USB-Charger unit from USB-port to offer power for built-in LED light source, desired functions as power-bank during power fail time.

(4) To allow people to insert male-plug into USB-ports which has type A, type C, Androi, or micro-SD card or other memory card female receiving ports.

(5) The USB Charger-unit base has wire-arrangement design and construction so can make wire in nice and net arrangement.

From FIG. 7F has decorative or-and functional unit top of the USB-Charger unit has more than one decorative and functions including (a) The decorative or-and functional unit is one of water, seasonal, snow flake, auto spray-snow, music, fragrancy spray ball (7/8) which optional can rotatable with ball base and can twist to get desired spring-melody or built-in IC music or built-in air-freshener to outside from the speaker (7/7) or-and window (7/6). Or (b) the decorative or-and functional unit is one of other part which has moving or tracking or magnetic or rotating or spin or vibration or shaking reacted-piece(s) such as car, train, toy, animal, characters, miniature items to (c) The decorative or-and functions unit is one of decorative parts including miniature building, house, garden, tree, scene, nature, mountain to let people to see to touch.

(d) The decorative or-and functiona unit is one of LED lighting device which offer the desired light show, effect, performance, color, brightness, moving light, changing light, hi-low or other level brightness, motion or non-motion selection light, power fail light, project clear lighted image or patterns as co-inventor's plurality issued and co-pending parents filed.

(e) The decorative or-and functional unit is one of compartments assembly has one or more level or compartments and each has one or more than one of space(s) to let people to put or arrange items put inside.

From above discussed all the USB Charger related products for Desktop application has decorative or-and functional unit on top or below USB-charge unit. The said decorative or-and functional unit definition is any items which people will put on desk top or bed-side table, or working table, or cosmetic-table which has decorative, or-and functional, or-and moving, or-and rotating, and supply people to see, to touch, to hear, to smell, to eat, to feel the functions, effects performance is fall within the scope of the said decorative or-and functional units or items.

From below discussing for desktop USB charger related products has LED light effects top of the other decorative or-and functional existing functions which is other optional features of current invention and co-inventor's parent filed case. It is appreciated all the idea, concept, construction discussed on all above and below should still fall within the current invention claim scope inspite of the limited drawing, figure, words inside this applications. Any the same function, equivalent, or replaceable skill should also still fall within the current invention claim coverage.

From FIG. 7G show the other preferred decorative or-and functional unit (7g) top of the USB-charger unit (7g6) which has desired number of USB-ports for type A, Type C, Androi USB, SD Card, Micro-SD card or other female receiving-ports, and AC outlet, and optional wire-arrangement on base. The said decorative or-and functional unit (7G) has wall (7g1) surrounding to form one open compartment so can put on house or office entrance or working table or side-table of bed. From FIG. 7F product is good for people to put the Key (7g4) (7g5), Coin (7g2) (7g3), phone, pad, laptop on open-space and it also can power, distribution digital-data, space to put items and other desired functions as above listed and discussed From FIG. 8 show the decorative or-and functions unit (8i) has presenting time related decorative or-and functional device. The FIG. 8 the USB-charger unit (8e) has wires to get power source and has built-in USB-port (8d) and outlet (8c) (8b) and has top surface is a time piece dial-face (8a) with center axis to make hour, minute, second arms to move by under time-movement device. The second arm (8f) has magnetic-piece reaction with the top magnetic-duck(s) (8r) (8q) or turtle (8s) to make duck or turtle to move per-second so make the decorative or-and functional moving or motion effects and also present time.

From FIG. 9 show the finished product of FIG. 8 which has the moving duck (9h) or turtle (9d) every second basing on the magnetic-reaction between time-piece magnetic arms on base and magnetic-duck or magnetic-turtle on the top compartment. This is typical for decorative or-and functions unit has moving or movable or rotating or spinging or vibration or shaking effects which same as above discussed FIG. 7E and FIG. 7F and FIG. 4 and each has different construction and design.

From FIG. 10 show the added-on or built-in decorative or-and functional unit (10g) to top of the USB-charger unit (10A). The decorative or functional unit (101) has LED or OLED or LCD displayer to show the time (10j) and temperature (10h) and date (10j) or other weather, month, day, year, alarm, weather station data to people with setting and adjustment knobs on back to allow people to make setting. The inside can add any desired liquid or miniature items depend on market requirement. This FIG. 10 show the same as above discussed FIG. 7A and FIG. 7C for added-on or built-in decorative or-and functional unit on top-area by assembly skill available from market place. Furthermore, the said LED light source with its circuit or-and IC may install on the said decorative or-and functions unit (100 or-and install on the USB-Charger unit (10A) to get desired LED light show, function. Performance as above discussed.

From FIGS. 11a, 11b, 11c, 11d, 12 show the other preferred one or more than one compartment(s) which can have desired inner medium, miniature-items, function device with build in LED (18G)(19D)(28D) with its circuitry (19A) (19B) (18i) (18j) (28E) (28F) with AC wires (18B)(28F) (28F') and sensor (18M) to assembly inside the two half base (21) (22) to form a desired USB Charger related products has USB-ports (18H)(19H) (19H') (22C) (22D)(28i) (28i').

From FIG. 13 which is similar with as FIGS. 8, 9 only different is FIG. 8 has magnetic reaction piece but FIG. 13 without the magnetic-piece just moving second, minute, hour arms and FIG. 13 has USB-ports (88H) (88G) (88G") with desired port specifications and has the AC wires with male-plug to connect with AC source to supply power to inner circuit to offer the DC current to time movement and optional LED light source. The FIG. 13 show a tilt dial-face unit can sit on the desktop (All kind desk) surface or-and has the all kind of USB-ports or-and AC outlet and Hub.

Figure 14:
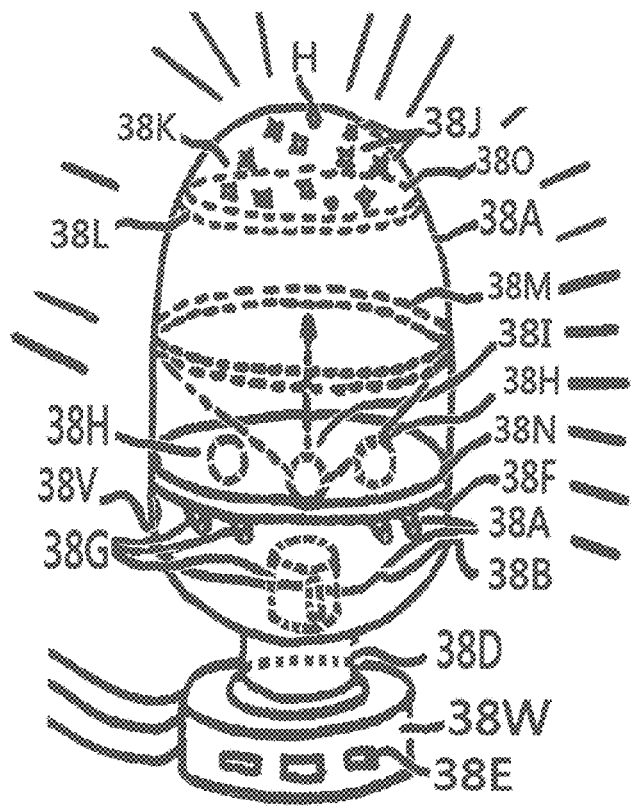

From FIG. 14 show a desktop decorative or-and function unit (H) has LED light source (38I) to emit light-beam to top $1^{st}$ optics-lens (38M) which has reflective or-and refractive properties to spread out the narrow LED light-beam into wider areas and emit out from unit. And some light-beams emit out from the refractive-lens (38M) to emit to $2^{nd}$ optics-lens (38L) which preferred has reflective or-and refractive optics-properties so can make some input light-beam emit out from $1^{st}$ optics-lens (38M) to reflected or-and refracted to outside areas. The said LED (38I) (38H) (38H') install on the base (38N) and the base is connect with lower position PCB and axis of the lower motor & gear-set to make the LEDs or top $1^{st}$ or-and $2^{nd}$ optics-lens to rotating so can make splendid light effects light performance to become a lighting decorative or-and functional unit (H) to install or add-on the top of the lower USB-Charger unit.

Figure 15:
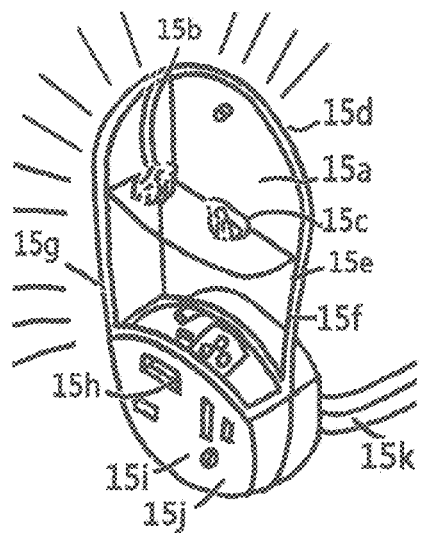
Figure 16:
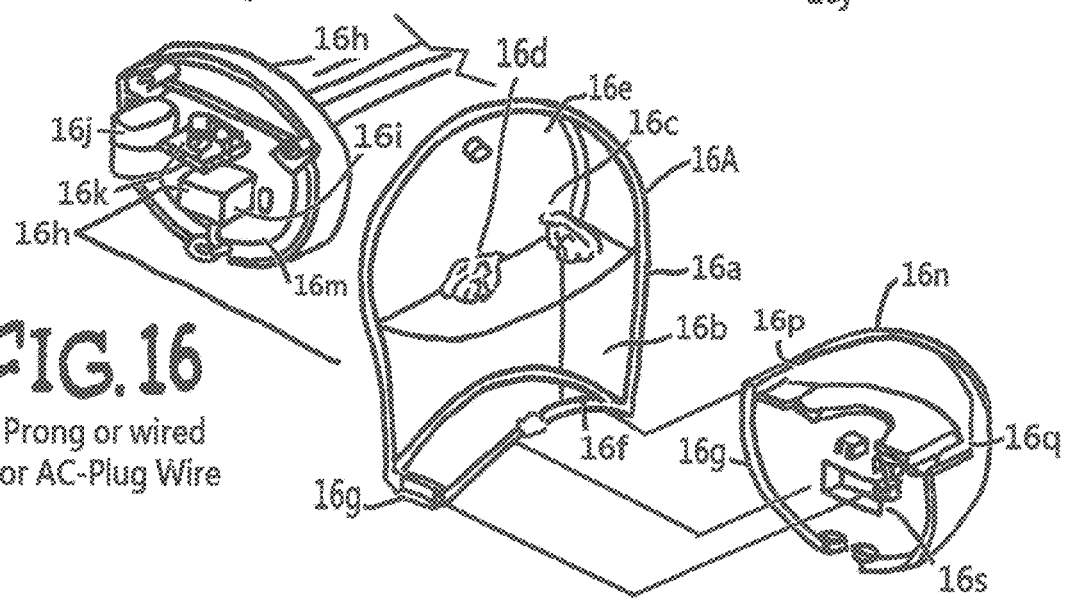

FIG. 15 and FIG. 16 show the similar application for the Desktop USB Charger related products with FIGS. 11a, 11b, 11c, 11d, 12. The different is the compartment number is different for one or more than one.

From FIG. 17 show the one other magnetic-reaction desktop glitter or reflective liquid items. This is co-inventor's parent filed case for plug-in night light and current invention has similar construction but has difference are:

a. Has the built-in USB-ports or-and AC outlets.
b. Has the AC wire with male-plug to get AC power, Not prong to plug-into wall
c. Has flat-base and heavy-weight unit install to well put on all kind of desktop and the weight-unit is heavy enough to overcome the AC wire weight to make move or shaking or fall down from all kind of desktop.

As noted above, the decorative or-and functional unit can be (i) a medium included in the compartment may be selected from a liquid, fluid, oil, chemical compounds, water, salt water, wax, gel, or some liquid-to-solid or solid-to-liquid material in addition, at least one miniature itemI(s) may also be provided. The decorative-means may be selected from a reflective-means, diffusion-means, or optics-means to increase the value or appearance of the charger related product. Still further, at least one miniature means may be provided within the medium-means, the miniature being selected from one or more shell, leaves, dry flowers, potpourri, plastic piece, floating stuff, fish, animal, smiling face, metal piece, paper piece, wood piece, boat, snow flake, tree, and any material with a predetermined shape and colors, the material having a design, indicia, drawing, color, painting, or coating that enhances the value and appearance by causing the medium means to look like a conventional gift, seasonal, or everyday item with an optional scene or background inside. Or, p (ii) a functional unit built-in or added-on the said preferred USB charger related product having a built-in function unit which may include (a) circuit for providing an LED light with desired functions selected from the group consisting of steady on and off, pair flashing, scanning, color mixing, color changing, all flashing, and any combination of such functions.

(b) time related assembly, (c) magnetic piece assembly, (d) motor and gear-set assembly to make miniature items or decorative items or characters or parts to moving, rotating, spin, tacking, vibration, shaking, (e) one or more compartment(s) assembly to put people items within with rotatable, moveable, extendable function for easily put inside items or take out items, (f) music or audio related device to input or output the sound, melody, music to people to hear, (g) smell device to spread out smell, fragrance, air-freshener to people for smell, (h) rotating, spin, movable device to make the said decorative unit, miniature items, reflectors, ball, compartment(s) to move, (i) heat device to make the chemical, salt water, gel, oil, heat sensitive items to move while be heated by heat device, so can make the USB charger related products increase practical functions built-in or add-on the said USB-Charger unit which has at least one USB-ports or-and AC outlets or-and other female receiving-ports.

The input AC current for the USB charger related products may have a range of from 110V to 250 or 108V to 138 Volt and DC current output at least 1 Amp. A AC-to-DC circuit is included to change the AC power source to DC power having a voltage of 3.5 Volt DC to 8.5 Volt DC at the USB charging port(s). The output DC current can be 5.2 Volt so to get quickly charger result or the USB-port can use the update grade can be USB 3.0 which is clear definition on 2010 which has more conductive and more bigger current or digital-data delivery.

The above-described USB charger related products not only has USB-power charging function but also has one or more others functions such as a USB electric-signal or digital-data distribution or divider or connector device or hub-functions (as opposed to current chargers), wire-arrangement construction function, outlet device function, motion sensor device function, time device function, remote control device function, infrared device function, LED light device function, LED aquarium light device function, LED fluid light device function, LED lava light device function, LED Glitter light device function, LED wax light device function, LED light having a built-in fluid, liquid, wax, or gel container with or without inner heater-set function, integrated circuit (IC) function, control device(s) function, smell device function, air-circulation device function, aircleaner device function, air-freshener device function, liquid air-freshener device function, wax air-freshener device function, air-purification device sensor device function, light device function, sensor device(s) function, power fail device function, color changing status indicator devices function, controller device function, motion device function, audio device function, video device function, cable TV device function, Internet device function, or other electric or electronic device(s) to enable the charger related product to have one or more additional function.

The USB charger related products may also include at least one device selected from a motor, movement, filter device, IC chips with desired functions, sensor, rotating filter, magnetic piece and metal pieces, and sound receiver device to provide additional audiovisual effects and functions, as a switch means to enable selection of the multiple functions.

The USB charger preferably supplies a DC charging current of more than 1 Amp. The larger the charging current, the shorter the charging time period.

The USB charger related products may also include at least one AC power outlet for receiving a male-plug of another device to supply AC Power to the other device. However, those skilled in the art will appreciate that if the AC power outlets, LED-units, or other electric function device(s) are omitted, the size of the input AC power wire may be reduced while still meeting AC Power wire safety requirements. On the other hand, if additional AC outlets are included, the charger related product may optionally incorporate other power outlet related devices such as surge protection circuit, remote controller, a master power outlet (when the master outlet is turned on, all of the other outlets are simultaneously turned or turned on at a later time), sensor, current leakage warning system, and/or auto shut-off system to increase the safety and convenience of the outlets. The above-described built-in USB-charger(s), AC power outlet(s), LED-unit(s) and other electric function device(s) may provide more than three functions, in which case the built-in AC power wire is arranged to meet the outlet's AC power wire safety standard.

The USB charger related products has a geometric shape with a space or magnetic-holder to store something within such as a stapler-pin, metal paper clip, keys, nails, pins, hair clips, and so forth, and also has sufficient weight to become a paperweight as needed.

The invention claimed is:

1. A USB charger device with an additional function or ornamentation, comprising:
   at least one USB port for receiving a male plug of a USB wire to deliver digital data or a charging current of at least 1 Amp to an external product;
   an input-wire to connect the USB charger device with an AC power source between 108V and 250V AC, either:
      (a) through an external transformer for converting AC power from the AC power source into a DC current for supplying the charging current to the at least one USB port, to provide power for the additional functions, and/or for input to a DC-to-DC circuit that supplies the charging current and/or the power for the at least one additional function, or
      (b) to supply the AC power to an internal AC-to-DC circuit for converting the AC power into said DC current; and
   at least one decorative or functional unit built-in or added onto the USB charger device to enable the USB charger device to not only deliver said charging current or digital data, but which also enhances a value of USB charger device by providing the at least one additional function or ornamentation.

2. The USB charger device as claimed in claim 1, further comprising an additional function unit, parts, or assembly for providing the at least one additional function, said additional function unit, parts, or assembly selected from the group consisting of:
   (1) a hub assembly to deliver digital data or signals,
   (2) an AC outlet assembly,
   (3) a sensor or sensor assembly,
   (4) a time, weather, or calendar assembly,
   (5) a remote control system,
   (6) an infrared system,
   (7) a LED light assembly or arrangement,
   (8) an integrated circuit (IC),
   (9) a control system,
   (10) a power fail system,
   (11) a color changing system,
   (12) an LED status indicating device,
   (13) a smell related item,
   (14) a motor and moving or rotating parts,
   (15) an audio system,
   (16) a music box,
   (17) a video system,
   (18) a cable TV related device,
   (19) an Internet related system, and
   (20) a wireless device.

3. The USB charger device as claimed in claim 1, further comprising at least one parts or kits or circuitry selected from a motor, movement, IC chips with desired functions, sensor, rotating mechanism magnetic piece and metal pieces, and/or sound receiver system to provide additional audiovisual effects and functions, and/or a switch to enable selection of the multiple functions.

4. The USB charger device as claimed in claim 1, wherein the USB charger device has at least one geometrically shaped compartment or level with a space to store at least one item therein, and/or a magnetic kit to install the at least one item.

5. The USB charger device as claimed in claim 4, wherein said at least one item includes at least one of a stapler-pin, metal paper clip, keys, nails, pins, pens, pencils, remote control, earring, bracelet, pendent, necklace, jewelry, hair clip or any item people normally carried or worn by people.

6. The USB charger device as claimed in claim 1, wherein the USB charger device has sufficient weight to install on a desktop by magnetic kits, and/or 3M tape or Velcro tape, and/or by glue, and/or by hook-holes, nails or screws, and/or by fastening kits.

7. The USB charger device as claimed in claim 1, wherein the USB charger device has USB-ports and at least one AC outlet, and wherein the USB charger device further includes outlet safety or convenience parts and accessories selected from circuitry for providing at least one of the following functions: overheat protection, surge protection, remote control, a master power controller, a sensor, a current leakage warning, auto shut off, and wire arrangement.

8. The USB charger device as claimed in claim 1, wherein the USB charger device has USB-ports, at least one AC outlet, and at least one LED-unit, and wherein the AC input wire has a gauge sufficient to meet safety requirements for a device having AC outlets.

9. The USB charger device as claimed in claim 1, wherein the charger device includes at least one LED and circuit for providing the LED with desired functions selected from the group consisting of steady on and off, pair flashing, scanning, color mixing, color changing, all flashing, hi-low or more level of brightness, sensor selection function, photo-sensor or motion-sensor selection switch, hi-low or photo-sensor select switch, motion or non-motion selection switch, or-and any combination selected from desired light-effects, switch, sensor selection, turn-on and turn-off timing selections, and any combination of such functions.

10. The USB charger device as claimed in claim 1, wherein the at least one USB port is adapted to deliver only charging current, to deliver only digital data, or to deliver both charging current and digital data.

11. The USB charger device as claimed in claim 1, wherein the USB charger device includes a plurality of the USB ports to supply charging current or digital data to a plurality of different external products simultaneously.

12. The USB charger device as claimed in claim 11, wherein the external products are selected from a printer, portable USB device, camera, video device, and scanner.

13. A built-in, added-on, detachable, extend-and-retractable, or foldable ornamental or functional unit for a USB charger device, comprising at least one of the following:
   (I) a compartment-assembly having at least one compartment for a medium selected from the group consisting of a liquid, oil, chemical compounds, water, salt water, wax, gel, liquid-to-gel or solid material, and solid-to-liquid material, and further including at least one of:
      (i) a motor,
      (ii) a rotating device,
      (iii) a heating element,
      (iv) at least one of filler item for inclusion within the compartment and selected from (a) floating items, (b) reflectors, (c) lava, (d) glitter, and (e) at least one miniature item selected from the group consisting of shells, leaves, dry flowers, potpourri, a plastic piece, floating stuff, a fish, an animal, a smiling face, a metal piece, a paper piece, a wood piece, a boat, a snow flake, a tree, and material with a predetermined shape, color, design, indicia, drawing, color, painting, or coating;
   (II) an organizer with one or more compartments, each having one or more layers, dividers, drawers, spaces, or stationary-holders for people to put items including pins, staples, nails, clippers, pens, pencils, earrings, pendants, bracelets, keys, jewelry, or rings;
   (III) an audio or olfactory device;
   (IV) a physics device that demonstrates physics principles of magnetism or motion;
   (V) a device for causing motion of a medium or other items included in a display unit; and
   (VI) an item with magnetic properties, and
      wherein the ornamental or functional unit enhances a value of USB charger device by providing the USB charger device with an additional function or ornamentation, and
      wherein the said USB charger device has at last one USB port that outputs a DC charging current of at least 1.0 Amp and 5.0 Volt to charge other products when connected with a male USB plug of Type A, B, C, D, E construction.

14. A built-in, added-on, detachable, extend-and-retractable, or foldable ornamental or functional unit for a USB charger device as claimed in claim 13, further comprising at least one of:
   (i) an outlet to supply AC current to AC operated products,
   (ii) an LED light device to offer desired LED illumination,
   (iii) a moveable or rotatable device including a motor and gear-set,
   (iv) at least one of a wired or wireless remote controller, a sensor, a switch, a Bluetooth circuit, an IR, RF, Z-way, Zig-Bee, or Wifi communications circuit, and APP software.

15. A built-in, added-on, detachable, extend-and-retractable, or foldable ornamental or functional unit for a USB charger device as claimed in claim 13, wherein the ornamental or functional unit is adapted to be installed on a top or wall or base of the USB charger device.

16. A built-in, added-on, detachable, extend-and-retractable, or foldable ornamental or functional unit for a USB charger device as claimed in claim 13, wherein the ornamental or functional unit includes at least one AC outlet and is installed on top of the USB charger device.

17. A built-in, added-on, detachable, extend-and-retractable, or foldable ornamental or functional unit for a USB charger device as claimed in claim 13, wherein the ornamental or functional unit includes at least one LED, LED assembly, or LED bulb to provide the USB charger device with light effects.

18. A built-in, added-on, detachable, extend-and-retractable, or foldable ornamental or functional unit for a USB charger device as claimed in claim 13, wherein the ornamental or functional unit includes a motor and gear set to cause a train, character, or cartoon figure to move or rotating along a predetermined path.

* * * * *